US012261756B2

(12) United States Patent
Griot et al.

(10) Patent No.: US 12,261,756 B2
(45) Date of Patent: Mar. 25, 2025

(54) DATA PACKET STORE, FORWARD, AND MONITORING FUNCTIONALITY FOR NETWORK NODE OR MODEM

(71) Applicant: QUALCOMM Incorporated, San Diego, CA (US)

(72) Inventors: Miguel Griot, La Jolla, CA (US); Gavin Bernard Horn, La Jolla, CA (US); Ravi Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 15/593,492

(22) Filed: May 12, 2017

(65) Prior Publication Data

US 2017/0366423 A1    Dec. 21, 2017

Related U.S. Application Data

(60) Provisional application No. 62/350,568, filed on Jun. 15, 2016.

(51) Int. Cl.
    *H04L 12/26*      (2006.01)
    *H04L 43/062*     (2022.01)
    (Continued)

(52) U.S. Cl.
    CPC ........ *H04L 43/062* (2013.01); *H04L 43/0829* (2013.01); *H04L 43/0876* (2013.01);
    (Continued)

(58) Field of Classification Search
    None
    See application file for complete search history.

(56) References Cited

U.S. PATENT DOCUMENTS

| 8,954,598 B2 * | 2/2015 | Kampmann | .......... H04L 65/611 |
| | | | 370/312 |
| 9,730,156 B1 * | 8/2017 | Chamarty | ............... H04L 67/16 |

(Continued)

FOREIGN PATENT DOCUMENTS

| CN | 103327585 A | 9/2013 |
| CN | 104322113 A | 1/2015 |

(Continued)

OTHER PUBLICATIONS

3GPP TS 23.682 V13.6.0 3rdGeneration Partnership Project; Technical Specification GroupS ervices and System Aspects; Architectur eEnhancements t oFacilitate Communications with Packet Data Networks and Applications (Release13) (Year: 2016).*

(Continued)

*Primary Examiner* — Pamit Kaur
(74) *Attorney, Agent, or Firm* — Holland & Hart LLP

(57) ABSTRACT

Techniques are described for wireless communication. A method of wireless communication includes receiving from an application server, at a network node of a wireless communication system, an indication of data to be delivered to at least one wireless device; determining a handling of the data; and transmitting at least one report relating to the handling of the data to the application server. Another method of wireless communication includes receiving from an application processor of a wireless device, at a modem of the wireless device, a request to receive at least one report on events monitored at the modem; and transmitting the at least one report to the application processor.

73 Claims, 10 Drawing Sheets

(51) Int. Cl.
| | |
|---|---|
| *H04L 43/0829* | (2022.01) |
| *H04L 43/0876* | (2022.01) |
| *H04L 67/00* | (2022.01) |
| *H04L 67/10* | (2022.01) |
| *H04L 67/50* | (2022.01) |
| *H04L 67/563* | (2022.01) |
| *H04W 52/02* | (2009.01) |
| *H04W 72/12* | (2023.01) |

(52) U.S. Cl.
CPC ............ *H04L 67/00* (2013.01); *H04L 67/10* (2013.01); *H04L 67/535* (2022.05); *H04L 67/563* (2022.05); *H04W 52/0209* (2013.01); *H04W 52/0216* (2013.01); *H04W 72/12* (2013.01); *Y02D 30/70* (2020.08)

(56) References Cited

U.S. PATENT DOCUMENTS

| | | | |
|---|---|---|---|
| 2007/0149129 A1 | 6/2007 | Das et al. | |
| 2010/0150134 A1* | 6/2010 | Qiu | H04L 47/781 370/352 |
| 2010/0232437 A1* | 9/2010 | Bajpai | H04L 1/1896 370/400 |
| 2012/0020393 A1 | 1/2012 | Patil et al. | |
| 2012/0281559 A1 | 11/2012 | Ner et al. | |
| 2013/0286227 A1* | 10/2013 | Lau | G06F 3/005 348/207.1 |
| 2014/0029493 A1* | 1/2014 | Vos | H04L 67/2823 370/310 |
| 2015/0304865 A1* | 10/2015 | Poscher | H04W 24/10 370/252 |
| 2016/0174148 A1* | 6/2016 | Seed | H04W 40/005 370/311 |
| 2016/0205625 A1* | 7/2016 | Stojanovski | H04W 76/27 370/311 |
| 2016/0218988 A1* | 7/2016 | Huang-Fu | H04L 29/08 |
| 2016/0255522 A1* | 9/2016 | Emanuelsson | H04W 28/0252 370/252 |
| 2017/0317894 A1* | 11/2017 | Dao | H04L 41/5009 |
| 2018/0115923 A1* | 4/2018 | Chandramouli | H04L 67/568 |

FOREIGN PATENT DOCUMENTS

| | | |
|---|---|---|
| CN | 104780512 A | 7/2015 |
| CN | 104813641 A | 7/2015 |
| CN | 106688266 A | 5/2017 |
| WO | WO-2007075741 A2 | 7/2007 |
| WO | WO-2012012780 | 1/2012 |
| WO | WO-2016007472 A1 | 1/2016 |
| WO | WO-2016055094 A1 | 4/2016 |
| WO | WO-2016065841 A1 | 5/2016 |
| WO | WO-2016069139 A1 | 5/2016 |

OTHER PUBLICATIONS

3GPP TS 23.682: "3rd Generation Partnership Project; Technical Specification Group Services and System Aspects; Architecture Enhancements to Facilitate Communications with Packet Data Networks and Applications (Release 13)", V13.6.0 (Apr. 2016), 3GPP Draft, INTERIM_DRAFT_23682- D60_CRS_IMPLEMENTED, 3rd Generation Partnership Project (3GPP), Mobile Competence Centre, 650, Route Des Lucioles, F-06921 Sophia-Antipolis Cedex, France, Apr. 26, 2016 (Apr. 26, 2016), XP051115844, pp. 1-91, Retrieved from the Internet:URL:http://www.3gpp.org/ftp/tsg_sa/WG2_Arch/Latest_SA2_Specs/DRAFT_INTERIM/Archive/ [retrieved on Apr. 26, 2016].

Ericsson: "HLCOM for NIDD via SCEF", 3GPP Draft, SA WG2 Meeting #114, S2-161563_CR23682_HLCOM_ FOR_NIDD_V1.3, 3rd Generation Partnership Project (3GPP), Mobile Competence Centre, 650, Route Des Lucioles, F-06921 Sophia-Antipolis Cedex, France, vol. SA WG2, No. Sophia Antipolis, France, Apr. 11, 2016-Apr. 15, 2016, Apr. 5, 2016 (Apr. 5, 2016), XP051086549, 3 Pages, Retrieved from the Internet: URL:http://www.3gpp.org/ftp/tsg_sa/WG2_Arch/TSGS2_114_Sophia_Antipolis/Docs/ [retrieved on Apr. 5, 2016].

Qualcomm Incorporated: "Introducing VBR Parameter in PCC Rules," SA WG2 Meeting #113, S2-160395, Jan. 25-30, 2016, Frigate Bay, St. Kitts and Nevis, 21 pages.

ISA/EP, International Search Report and Written Opinion of the International Searching Authority, Int'l Application No. PCT/US2017/032634, Jul. 19, 2017, European Patent Office, Rijswijk, NL, 11 pgs.

* cited by examiner

DATA PACKET STORE, FORWARD, AND MONITORING FUNCTIONALITY FOR NETWORK NODE OR MODEM

CROSS REFERENCES

The present Application for Patent claims priority to U.S. Provisional Patent Application No. 62/350,568 by Griot, et al., entitled "Data Packet Store, Forward, and Monitoring Functionality for Network Node or Modem," filed Jun. 15, 2016, assigned to the assignee hereof.

INTRODUCTION

The present disclosure, for example, relates to wireless communication systems, and more particularly to data packet store, forward, and monitoring functionality for a network node or modem.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system or LTE-Advanced (LTE-A) system). A wireless multiple-access communication system may include a number of base stations, each simultaneously supporting communication for multiple communication devices, which may be otherwise known as user equipment (UEs). A base station may communicate with UEs on downlink channels (e.g., for transmissions from a base station to a UE) and uplink channels (e.g., for transmissions from a UE to a base station).

Some types of UEs may communicate with a base station or other UEs using narrow-band communication. Narrow-band communication may include, for example, narrow-band LTE (NB-LTE) communication, Machine-to-Machine (M2M) communication (of which Machine Type Communication (MTC) or enhanced MTC (eMTC) may be considered a part for purposes of this disclosure), NB-Internet of Things (NB-IoT) communication, and the like.

Some IoT devices (and other wireless devices) may operate for long periods without a battery recharge, or may have long-lasting single-use batteries, or may rely on irregular or intermittent battery recharging (e.g., solar or other renewable energy charging). These and other wireless devices may use power saving techniques (e.g., a Power Save Mode (PSM) or Extended Idle Discontinuous Reception (Extended I-DRX) Mode) to extend battery life.

SUMMARY

A method of wireless communication is described. The method may include receiving from an application server, at a network node of a wireless communication system, an indication of data to be delivered to at least one wireless device, determining a handling of the data, and transmitting at least one report relating to the handling of the data to the application server.

An apparatus for wireless communication is described. The apparatus may include means for receiving from an application server, at a network node of a wireless communication system, an indication of data to be delivered to at least one wireless device, means for determining a handling of the data, and means for transmitting at least one report relating to the handling of the data to the application server.

Another apparatus for wireless communication is described. The apparatus may include a processor, memory in electronic communication with the processor, and instructions stored in the memory. The instructions may be operable to cause the processor to receive from an application server, at a network node of a wireless communication system, an indication of data to be delivered to at least one wireless device, to determine a handling of the data, and to transmit at least one report relating to the handling of the data to the application server.

A non-transitory computer readable medium for wireless communication is described. The non-transitory computer-readable medium may include instructions operable to cause a processor to receive from an application server, at a network node of a wireless communication system, an indication of data to be delivered to at least one wireless device, to determine a handling of the data, and to transmit at least one report relating to the handling of the data to the application server.

Some examples of the method, apparatus, and non-transitory computer-readable medium described above may further include processes, features, means, or instructions for receiving, from the application server, a data handling request applicable to the data. The data handling request may include: a first indication of whether to store the data, prior to delivery of the data to a wireless device of the at least one wireless device, when the wireless device is unreachable; a second indication of a maximum time to store the data when the wireless device is unreachable; a maximum number of data packets to store when the wireless device is unreachable; or a combination thereof.

Some examples of the method, apparatus, and non-transitory computer-readable medium described above may further include processes, features, means, or instructions for receiving, from the application server, a data handling monitoring request applicable to the data. In some examples, the report relating to the handling of the data at the network node may be based at least in part on the data handling monitoring request.

In some examples of the method, apparatus, and non-transitory computer-readable medium described above, the at least one report relating to the handling of the data may include: a first indication of data packets received; a second indication of data packets stored; a third indication of an expected data packet storage time; a fourth indication of a maximum data packet storage time; a fifth indication of a number of data packets queued for delivery to the at least one wireless device; a sixth indication of data packets forwarded to the at least one wireless device; a seventh indication of data packets dropped at a core network; an eighth indication of data packets dropped in a radio access network coupling the core network to the at least one wireless device; a ninth indication of data packets successfully received by the at least one wireless device; or a combination thereof.

In some examples of the method, apparatus, and non-transitory computer-readable medium described above, the determined handling of the data may include a storage of the data prior to delivery of the data to a wireless device of the at least one wireless device. In some examples, the determined handling of the data may include a forwarding of the stored data to the wireless device.

In some examples of the method, apparatus, and non-transitory computer-readable medium described above, the at least one report relating to the handling of the data may be transmitted to the application server: on demand; periodically; in response to a trigger event; or a combination thereof.

In some examples of the method, apparatus, and non-transitory computer-readable medium described above, transmitting the at least one report relating to the handling of the data to the application server may include: collecting information associated with the handling of the data at a gateway (e.g., a serving gateway), and forwarding the collected information to the application server via a server. In some examples, the server may be a service capability exposure functionality (SCEF) server. In some examples, transmitting the at least one report relating to the handling of the data to the application server may include: collecting information associated with the handling of the data from a serving gateway, at a mobility management entity (MME) or a mobility management function, and forwarding the collected information from the MME to the application server via a server (e.g., SCEF server). In some examples, the MME may add information to the collected information before forwarding the collected information from the MME to the application server via the SCEF server.

A method of wireless communication is described. The method may include receiving from an application processor of a wireless device, at a modem of the wireless device, a request to receive at least one report on events monitored at the modem, and transmitting the at least one report to the application processor.

An apparatus for wireless communication is described. The apparatus may include means for receiving from an application processor of a wireless device, at a modem of the wireless device, a request to receive at least one report on events monitored at the modem, and means for transmitting the at least one report to the application processor.

Another apparatus for wireless communication is described. The apparatus may include a processor, memory in electronic communication with the processor, and instructions stored in the memory. The instructions may be operable to cause the processor to receive from an application processor of a wireless device, at a modem of the wireless device, a request to receive at least one report on events monitored at the modem, and to transmit the at least one report to the application processor.

A non-transitory computer readable medium for wireless communication is described. The non-transitory computer-readable medium may include instructions operable to cause a processor to receive from an application processor of a wireless device, at a modem of the wireless device, a request to receive at least one report on events monitored at the modem, and to transmit the at least one report to the application processor.

Some examples of the method, apparatus, and non-transitory computer-readable medium described above may further include processes, features, means, or instructions for receiving from the application processor, at the modem, data to transmit over a radio frequency spectrum, storing the data in a modem memory, and transmitting the stored data over the radio frequency spectrum.

Some examples of the method, apparatus, and non-transitory computer-readable medium described above may further include processes, features, means, or instructions for receiving from the application processor, at the modem, an indication that the data may be delay tolerant, and storing the data in the modem memory based at least in part on receiving the indication that the data may be delay tolerant.

Some examples of the method, apparatus, and non-transitory computer-readable medium described above may further include processes, features, means, or instructions for receiving from the application processor, at the modem, data to transmit over a radio frequency spectrum, determining that the modem may be non-active or not ready to transmit, and storing the data in a modem memory based at least in part on determining that the modem may be non-active or not ready to transmit.

Some examples of the method, apparatus, and non-transitory computer-readable medium described above may further include processes, features, means, or instructions for determining that the modem may be active or ready to transmit after the modem is not active for a period of time, and transmitting the data over the radio frequency spectrum based at least in part on determining that the modem may be active or ready to transmit.

In some examples of the method, apparatus, and non-transitory computer-readable medium described above, the at least one report may include a modem status. The modem status may include: a first indication of an expected wait time until the modem becomes active or ready to transmit; a second indication of a modem state transition from not active (or not ready to transmit) to active; a third indication of a modem state transition from active to not active; or a combination thereof.

In some examples of the method, apparatus, and non-transitory computer-readable medium described above, the at least one report may include a data packet status. The data packet status may include: a first indication of data packets received and stored in a modem memory; a second indication of data packets queued at the modem; a third indication of data packets dropped by the modem; a fourth indication of data packets transmitted by the modem; a fifth indication of data packets successfully received by a device to which the modem transmits over the radio frequency spectrum; or a combination thereof.

In some examples of the method, apparatus, and non-transitory computer-readable medium described above, the at least one report may be transmitted to the application processor: on demand; periodically; in response to a trigger event; or a combination thereof.

A method of wireless communication is described. The method may include transmitting, from an application server, to a network node of a wireless communication system, an indication of data to be delivered to at least one wireless device, determining a handling of the data, and receiving, at the application server, at least one report relating to the handling of the data.

An apparatus for wireless communication is described. The apparatus may include means for transmitting, from an application server, to a network node of a wireless communication system, an indication of data to be delivered to at least one wireless device, means for determining a handling of the data, and means for receiving, at the application server, at least one report relating to the handling of the data.

Another apparatus for wireless communication is described. The apparatus may include a processor, memory in electronic communication with the processor, and instructions stored in the memory. The instructions may be operable to cause the processor to transmit, from an application server, to a network node of a wireless communication system, an indication of data to be delivered to at least one wireless device, determine a handling of the data, and receive, at the application server, at least one report relating to the handling of the data.

A non-transitory computer readable medium for wireless communication is described. The non-transitory computer-readable medium may include instructions operable to cause a processor to transmit, from an application server, to a network node of a wireless communication system, an indication of data to be delivered to at least one wireless device, determine a handling of the data, and receive, at the application server, at least one report relating to the handling of the data.

Some examples of the method, apparatus, and non-transitory computer-readable medium described above may further include processes, features, means, or instructions for transmitting, from the application server, a data handling monitoring request applicable to the data, wherein the at least one report relating to the handling of the data may be based at least in part on the data handling monitoring request.

Some examples of the method, apparatus, and non-transitory computer-readable medium described above may further include processes, features, means, or instructions for transmitting, from the application server, a data handling request applicable to the data.

In some examples of the method, apparatus, and non-transitory computer-readable medium described above, the data handling request comprises: a first indication of whether to store the data, prior to delivery of the data to a wireless device of the at least one wireless device, when the wireless device may be unreachable; a second indication of a maximum time to store the data when the wireless device may be unreachable; a maximum number of data packets to store when the wireless device may be unreachable; or a combination thereof.

In some examples of the method, apparatus, and non-transitory computer-readable medium described above, the at least one report relating to the handling of the data comprises: a first indication of data packets received; a second indication of data packets stored; a third indication of an expected data packet storage time; a fourth indication of a maximum data packet storage time; a fifth indication of a number of data packets queued for delivery to the at least one wireless device; a sixth indication of data packets forwarded to the at least one wireless device; a seventh indication of data packets dropped at a core network; an eighth indication of data packets dropped in a radio access network coupling the core network to the at least one wireless device; a ninth indication of data packets successfully received by the at least one wireless device; or a combination thereof.

In some examples of the method, apparatus, and non-transitory computer-readable medium described above, the determined handling of the data comprises a storage of the data prior to delivery of the data to a wireless device of the at least one wireless device.

In some examples of the method, apparatus, and non-transitory computer-readable medium described above, the determined handling of the data comprises a forwarding of the stored data to the wireless device.

In some examples of the method, apparatus, and non-transitory computer-readable medium described above, the at least one report relating to the handling of the data may be received by the application server: on demand; periodically; in response to a trigger event; or a combination thereof.

In some examples of the method, apparatus, and non-transitory computer-readable medium described above, receiving the at least one report relating to the handling of the data by the application server comprises: collecting information associated with the handling of the data at a gateway, and receiving, at the application server, the collected information forwarded via a server.

In some examples of the method, apparatus, and non-transitory computer-readable medium described above, receiving the at least one report relating to the handling of the data by the application server comprises: collecting information associated with the handling of the data from a gateway, at a mobility management function, and receiving, at the application server, the collected information from the mobility management function forwarded via a server.

Some examples of the method, apparatus, and non-transitory computer-readable medium described above may further include processes, features, means, or instructions for adding information to the collected information at the mobility management function, before forwarding the collected information from the mobility management function to the application server via the server.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
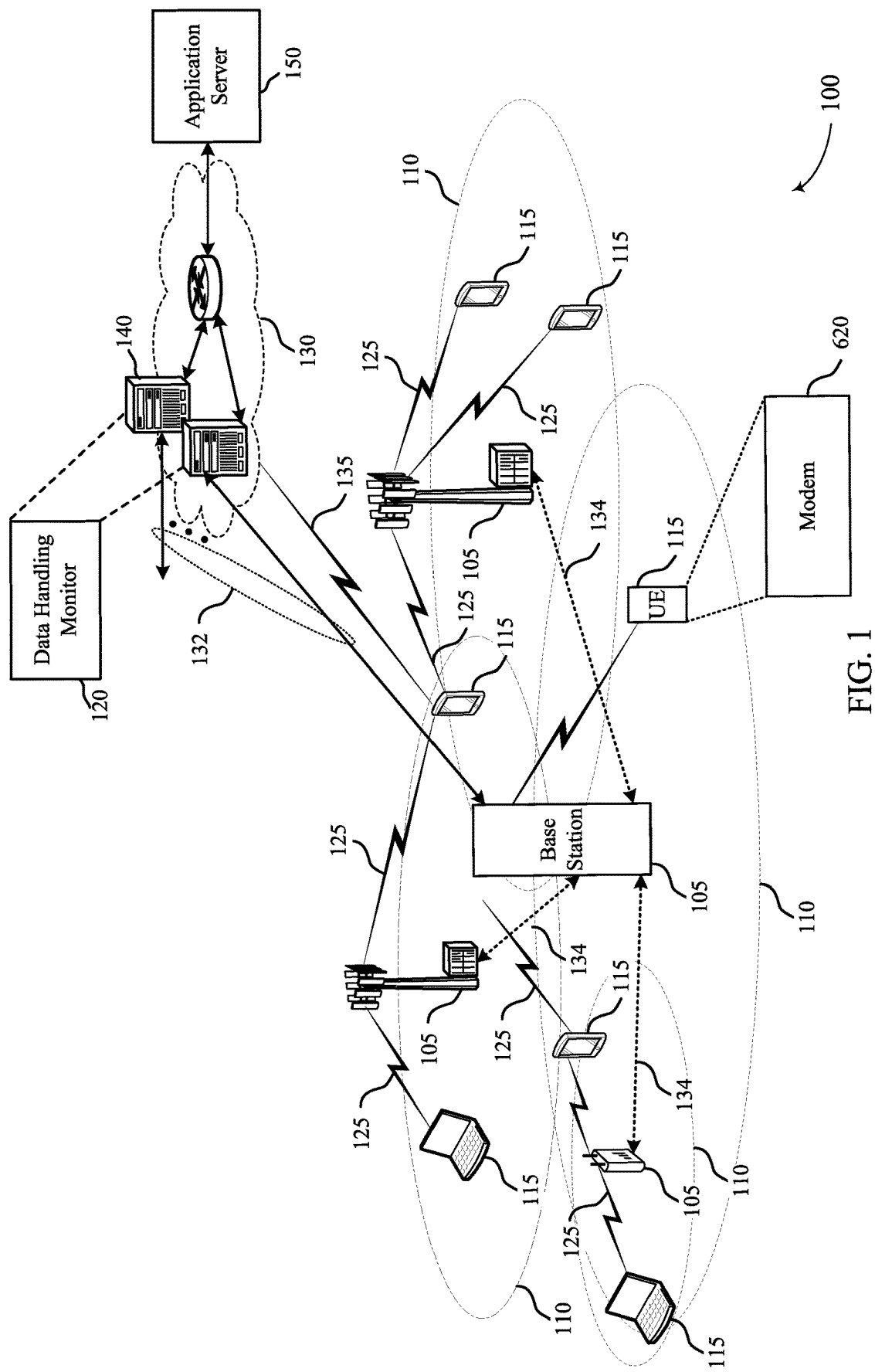
FIG. 1 shows an example of a wireless communication system, in accordance with one or more aspects of the present disclosure.

Techniques are described for storing and forwarding data, and for monitoring data handling (including the storing and forwarding of data) at a network node or modem. At a network node, store and forward functionality may be used to store data at the network node when a wireless device is unreachable, and to forward the data to the wireless device when the wireless device is available. Furthermore, store and forward functionality may be used to store data at the modem when the modem is not active or not ready to transmit, and to transmit the data over a radio frequency spectrum when the modem becomes active, when the amount of data stored at the modem exceeds a threshold, when the modem is ready to transmit, or a combination thereof. Reports relating to the monitoring may be transmitted to an application server (by the network node) or to an application processor of a wireless device (by the modem). The techniques enable the application server or application processor to monitor the handling of data and not wake a modem of a wireless device outside its normal wakeup schedule, thereby helping the wireless device to conserve battery power.

At a network node, monitoring functionality may include the monitoring of data handling and the transmission of reports relating to the data handling to an application server. In some examples, the application server may use the reports, for example, to determine if and when data has been forwarded to a wireless device. At a modem of a wireless device, in some examples, monitoring functionality may include the monitoring of data handling at the modem and the transmission of reports relating to the data handling to an application processor of the wireless device. The application processor may use the reports to determine if and when data has been transmitted over the radio frequency spectrum. At either or both of the network node and the modem, the data handling that is monitored may include store and forward data handling, among other examples.

In some examples, the described techniques may enable a network node of a wireless communication system to receive, from an application server, an indication of data to be delivered to at least one wireless device (e.g., at least one UE). The network node may determine a handling of the data (e.g., at the network node, at another network node, or at a radio access network (RAN)), and may transmit at least one report relating to the handling of the data to the application server.

In some examples, the described techniques may enable a modem of a wireless device (e.g., a UE) to receive, from an application processor of the wireless device, a request to receive at least one report on events monitored at the modem, and to transmit the at least one report to the application processor.

The following description provides examples, and is not limiting of the scope, applicability, or examples set forth in the claims. Changes may be made in the function and arrangement of elements discussed without departing from the scope of the disclosure.

Various examples may omit, substitute, or add various procedures or components as appropriate. For instance, the methods described may be performed in an order different from that described, and various operations may be added, omitted, or combined. Also, features described with respect to some examples may be combined in other examples.

FIG. 1 shows an example of a wireless communication system 100, in accordance with one or more aspects of the present disclosure. The wireless communication system 100 may include a radio access network (RAN) including a plurality of base stations 105 (e.g., eNodeBs (eNBs), gNodeBs (gNBs), and/or radio heads (RHs)), UEs 115, and a core network 130. The core network 130 may include one or more network nodes 140 and may provide user authentication, access authorization, tracking, Internet Protocol (IP) connectivity, and other access, routing, or mobility functions. The base stations 105 may interface with the core network 130 through backhaul links 132 (e.g., S1, N2, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, Xn, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a gNB, a NodeB, an eNodeB (eNB), a Home NodeB, a Home eNodeB, or some other suitable terminology. The geographic coverage area 110 for a base station 105 may be divided into sectors (not shown) making up a portion of the coverage area. The wireless communication system 100 may include base stations 105 of different types (e.g., macro or small cell base stations). There may be overlapping geographic coverage areas 110 for different technologies.

In some examples, the wireless communication system 100 may include an LTE/LTE-A network and may employ narrow-band communication techniques. In LTE/LTE-A networks, the term evolved Node B (eNB) may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context. In some examples, the wireless communication system 100 may include a next generation or 5G network that employs narrow-band communication techniques (in which case the base stations 105 may, in some examples, be replaced by access nodes including radio heads (e.g., smart radio heads) and access node controllers). In some examples, the base station 105 may also be referred to as a gNodeB, a gNB, an eNodeB, or an eNB.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell may also cover a relatively small geographic area (e.g., a home) and may provide restricted access by UEs having an association with the femto cell (e.g., UEs in a closed subscriber group (CSG), UEs for users in the home, and the like). An eNB or a gNB for a macro cell may be referred to as a macro eNB or a macro gNB, respectively. An eNB or a gNB for a small cell may be referred to as a small cell eNB, a small cell gNB, a pico eNB, a pico gNB, a femto eNB, a femto gNB, a home eNB, or a home gNB. An eNB or gNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A UE 115 may be a cellular phone, a personal digital assistant (PDA), a wireless modem, a wireless communication device, a handheld device, a tablet computer, a laptop computer, a cordless phone, a wireless local loop (WLL) station, a NB-LTE device, a M2M device, a MTC device, an eMTC device, a NB-IoT device or the like. A UE may be able to communicate with various types of base stations and network equipment, including macro eNBs, small cell eNBs, gNBs, relay base stations, and the like. A UE 115 such as an IoT device may, in some examples, be characterized by one or more non-traditional UE characteristics, such as: a lack of mobility, small size data exchanges (e.g., infrequent transmissions and receptions), infrequent data exchanges, delay tolerant data exchanges, or a requirement for long battery life (sometimes measured in years).

The communication links 125 shown in wireless communication system 100 may include downlinks (DL), from a base station 105 to a UE 115, or uplinks (ULs), from a UE 115 to a base station 105. The downlinks may also be called forward links, while the uplinks may also be called reverse links. The communication links 125 may include, for example, resources for wide-band physical control channels (e.g., a PRACH, physical downlink control channel (PDCCH), enhanced PDCCH (ePDCCH), or physical uplink control channel (PUCCH)), wide-band physical data channels (e.g., a physical downlink shared channel (PDSCH) or a physical uplink shared channel (PUSCH)), narrow-band physical control channels (e.g., a narrow-band PRACH, narrow-band PDCCH, a narrow-band ePDCCH, or a narrow-band PUCCH), and narrow-band physical data channels (e.g., a narrow-band PDSCH or narrow-band PUSCH). In some cases, a UE 115 may communicate with the core network 130, for example, through communication link 135.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency division duplexing (FDD) operation (e.g., using paired spectrum resources) or a time division duplexing (TDD) operation (e.g., using unpaired spectrum resources). Frame structures for FDD operation (e.g., frame structure type 1) and TDD operation (e.g., frame structure type 2) may be defined.

Wireless communication systems (e.g., LTE/LTE-A networks) have been optimized to cater to the non-traditional characteristics of IoT devices. The optimizations include, for example, Power Saving Mode (PSM) and Extended Idle Discontinuous Reception (Extended I-DRX) Mode.

In PSM, a wireless device may not perform access stratum (AS) or non-access stratum (NAS) procedures (e.g. page monitoring, mobility management related procedures, etc.) in the absence of mobile-originated (MO) data, except for periodic registration. Upon a MO data event and/or periodic registration event, a wireless device may find a suitable cell and enter a Connected Mode to perform data transfer and/or to register with a network. The network typically transitions a wireless device back to PSM upon completion of a data transfer and/or periodic registration exchange (possibly after waiting for some period of inactivity).

When mobile-terminated (MT) traffic arrives at a network node from an application server for a wireless device, the network may not be able to reach the wireless device until the wireless device initiates a connection with the network (e.g., due to an MO data event and/or periodic registration event). When MO data events are infrequent (which may be typical for an IoT device) and periodic registration timers are configured to be long (e.g., a few hours) to optimize device battery life, a wireless device may not be reachable for a long duration. During this period of time when the wireless device is unreachable, an application server may resend a data packet to the wireless device multiple times. The multiple transmissions of the data packet may be unnecessary.

To address some of the limitation of PSM, a Service Capability Exposure Functionality (SCEF) server has been introduced in the core network for PSM. In some cases, the SCEF server may also provide an Application Program Interface (API) to the application server, enabling the application server to communicate with the core network. In some other cases, an application server may subscribe to reachability monitoring via the SCEF server. In turn, the SCEF server may indicate to the application server when a wireless device becomes reachable, so that the application server can start sending MT data that it has for the wireless device. However, in such cases, it may take a long time for the data to reach the wireless device, since the data has to come all the way from the application server. The network may therefore have to keep the wireless device in Connected Mode for a long time, resulting in device battery consumption.

When a power saving function is enabled (e.g., in Extended I-DRX Mode), a wireless device periodically wakes up to monitor paging on a downlink. The frequency of periodic wake ups may be determined based at least in part on the latency requirements of a service that the wireless device is using. When the power saving function is enabled (e.g., Extended I-DRX Mode), a wireless device may perform required AS or NAS procedures (if any) for mobility management, similarly to what occurs during an LTE/LTE-A Idle mode, so that the network has tracking area level information of the wireless device and can reach the wireless device for paging.

Upon receiving a paging message (e.g., a paging message indicating that MT data is pending) from a network, or upon an MO data/signaling event, a wireless device in a power saving mode (e.g., Extended I-DRX Mode) may enter a Connected Mode for data/signaling exchange. The network may transition the wireless device back to Idle Mode upon completion of a data/signaling exchange (and possibly after waiting for some period of inactivity).

In some examples, a power saving mode (e.g., Extended I-DRX Mode) enables long (extended) DRX cycles in the order of tens of minutes. In 5G, these cycle lengths (e.g., DRX cycle lengths) may be further extended to an order of hours/days.

Building on LTE/LTE-A Idle Mode, a store and forward (S&F) functionality may be implemented in the core network for MT data transmitted when a power saving function is enabled (e.g., Extended I-DRX Mode). In some cases, a network function may provide the S&F functionality in the core network. In some examples, the network function may be or include a serving gateway (S-GW), a Session Management Function (SMF), a user plane function (UPF), or any other network function capable of S&F functionality. When MT data arrives at a S-GW (as one example of a network function providing the S&F functionality in the core network) from an application server, the S-GW may notify a MME or any other function capable of providing control plane functionality in a core network (e.g., Access and Mobility Management Function (AMF)) of receipt of the data via a Downlink Data Notification (DDN) message. In the DDN reply message, the MME or AMF may ask the S-GW, or any other network function with S&F functionality, to store the data for an extended time if a wireless device to which the data is being transmitted is using an extended DRX cycle. In some other cases, the S-GW or another function with S&F functionality may also handle data tunneling and data routing in a network.

Following reception of the DDN message, a function with S&F functionality, such as the S-GW, may then store the data pending further notification from the MME or AMF. In the meantime, the MME or AMF may page the wireless device at the next occasion per its (extended) DRX (paging) cycle. Once the wireless device receives the page and enters a Connected Mode, the MME or AMF may notify the S-GW. The S-GW may then forward the data to the wireless device. However, no notification is provided to the application server regarding whether the packet is dropped or stored. Hence, the application server may end up resending a data packet multiple times unnecessarily.

Thus, PSM enables the monitoring of data handling in the network node (via an SCEF server), but does not provide store and forward functionality for data handled in the network node. A wireless device operating in PSM may therefore be kept in Connected Mode for a longer time when an application server has MT data to send to the wireless device. If the wireless device is battery-operated, extending the time that a wireless device remains in Connected Mode can adversely affect the wireless device's battery. In contrast, activating or enabling a power save function (e.g., Extended I-DRX) may provide store and forward functionality for data handled in the core network, but may not provide for monitoring data handling in the core network. Thus, when a power saving function is enabled (e.g., in Extended I-DRX), an application server may not be aware of the status of data packets transmitted to a wireless device (e.g., the application server may not receive indications of when data packets are stored or lost in the core network), and the application server may resend a data packet multiple times and unnecessarily increase the traffic load on the core network.

The present disclosure describes techniques for enabling the monitoring of data handling at a one or more network nodes (e.g., one or more nodes of a core network, or one or more nodes that handle data between the core network and a RAN). The monitoring functionality may be enabled in a control path defined by one or more network nodes, with components of the control path controlling and/or monitoring events associated with a data path defined by one or more network nodes (in which the network nodes that define the data path may or may not include some or all of the network nodes that define the control path).

In some examples, the monitoring of the data handling may include a monitoring of store and forward functionality at one or more network nodes. The store and forward functionality may be introduced in the data path. The use of store and forward functionality may reduce delays in the transmission of data from an application server to at least one wireless device, while the monitoring functionality may provide the application server with visibility into the handling of data prior to delivery of the data to the at least one wireless device, including visibility into when store and forward functionality is invoked, and visibility into how the store and forward functionality affects the handling of the data.

In some examples, monitoring functionality may be provided at one or more of the network nodes 140 described with reference to FIG. 1 by providing the network node 140 with a data handling monitor 120. The data handling monitor 120 may be an example of aspects of the data handling monitor 220 described with reference to FIG. 2, among other examples.

The data handling monitor 120 may receive an indication of data to be delivered to at least one wireless device (e.g., at least one UE 115) from an application server 150 in communication with the core network 130; determine a handling of the data (e.g., at the network node 140, at another network node 140, or at one of the base stations 105); and transmit at least one report relating to the handling of the data to the application server 150. The application server 150 may be an example of aspects of the application server 230, 230-*a*, 230-*b*, and/or 230-*c* described with reference to FIGS. 2-5, among other examples.

The present disclosure also describes techniques for enabling the monitoring of data handling at a modem by an application processor (e.g., within a wireless device or UE 115). In the absence of such monitoring functionality, an application processor of a wireless device may not be aware of the status of a modem of the wireless device. For example, an application processor may not know whether a modem is active (or ready to transmit) or not active (e.g., dormant, or not ready to transmit), or the application processor may not know when the modem is scheduled to transition from an inactive state to an active state. When an application processor does not know the status of a modem, the application processor may send application data to the modem for transmission over a radio frequency spectrum, and may cause the modem to transition from an inactive state to an active state to transmit the data.

In IoE applications, in which the amount of data to be transmitted is small and delay tolerant, and in which the preservation of battery life may be more critical than making a data transmission, it may be more desirable to hold the data until a modem becomes active than to wake the modem at a non-scheduled wakeup time to make a data transmission. Also, it may be more battery-efficient to wait until the amount of data to be transmitted exceeds a threshold amount before transitioning the modem from an inactive state to an active state (e.g., due to the overhead associated with such a state transition).

By enabling a modem to transmit reports on modem events to an application processor, the application processor may store data to be transmitted over a radio frequency spectrum until the modem is an active state. Alternatively, the application processor may transmit the data to the modem; the modem may temporarily store the data; and the modem may transmit reports on the handling of the data (e.g., the storage and transmission of data) to the application processor, so that the application processor may regulate its transmission of additional data to the modem and/or determine whether data needs to be retransmitted to the modem (e.g., because a data packet is dropped).

In some examples, a modem 620 of a UE 115 described with reference to FIG. 1 may provide the UE 115 with modem monitoring functionality. For example, the modem 620 may receive, from an application processor of the UE 115, a request to receive at least one report on events monitored at the modem 620. The modem 620 may transmit the at least one report to the application processor of the UE 115. The modem 620 may be an example of aspects of the modem 620-*a* described with reference to FIG. 6, among other examples.

Figure 2:
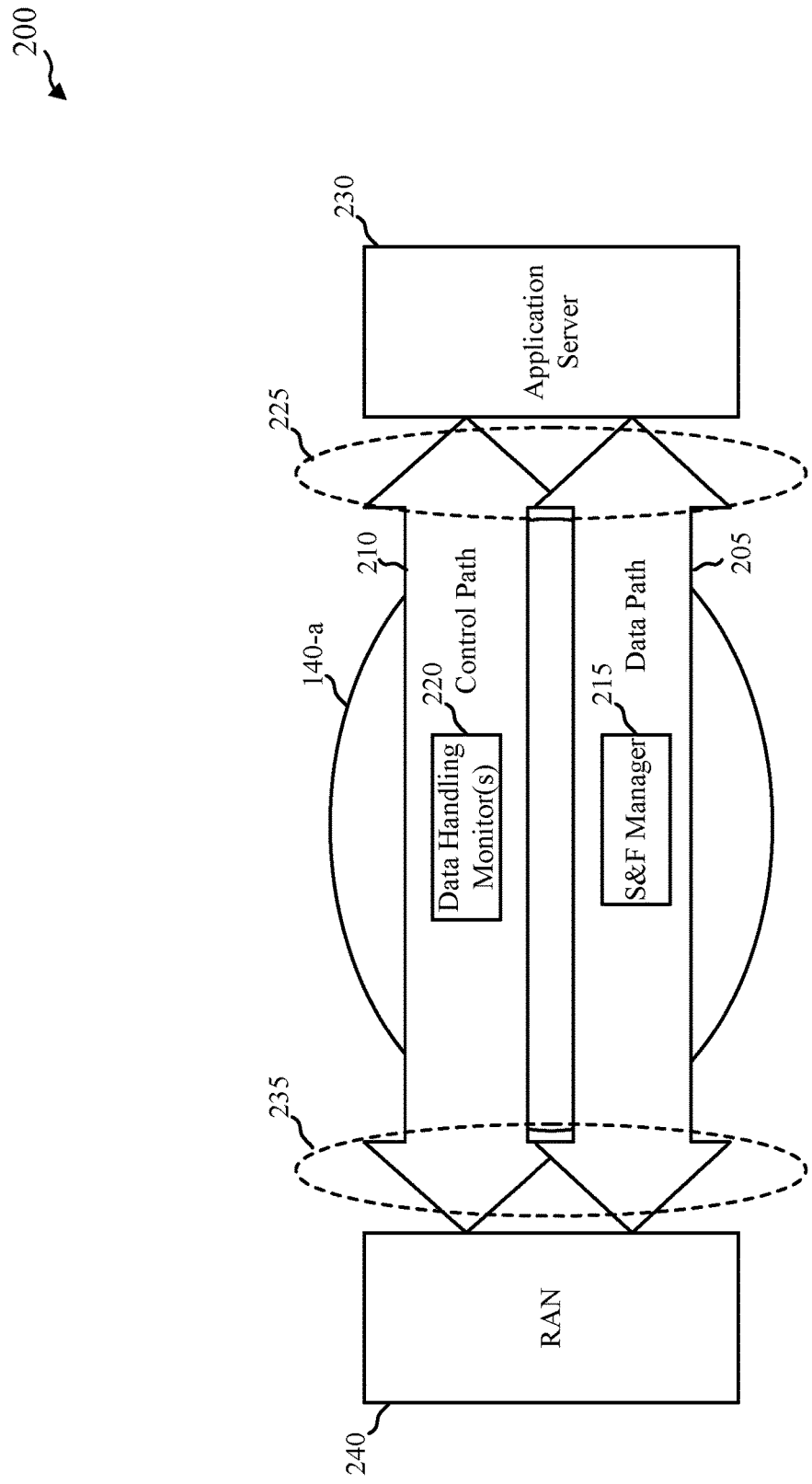
FIG. 2 shows an example architecture of a core network, in accordance with one or more aspects of the present disclosure.

FIG. 2 shows an example architecture 200 of one or more network nodes 140-*a*, in accordance with one or more aspects of the present disclosure. The network node(s) 140-*a* may be examples of aspects of the network nodes 140 described with reference to FIG. 1, or examples of other network nodes that handle data between the core network 130 and a RAN.

The network node(s) 140-*a* may include a data path 205 and a control path 210 (also referred to as a user plane path 205 and a control plane path 210, respectively). The data path 205 may optionally include data store and forward functionality, such as a store and forward (S&F) manager 215, or any other network function with S&F functionality such as a SMF and/or UPF. The control path 210 may include monitoring functionality, such as one or more data handling monitors 220. One or more application server interfaces 225 may provide an interface to the data path 205 and the control path 210 (or components thereof) to an application server 230. One or more RAN interfaces 235 may provide an interface to the data path 205 and the control path 210 to a RAN 240. The application server 230 may communicate with one or more wireless devices (e.g., UEs) connected to the RAN 240, by means of the network node(s) 140-*a* and the RAN 240.

In some examples, the data path 205 may receive, from the application server 230, data to deliver to at least one wireless device connected to the RAN 240. Components of the data path 205 may handle the data (e.g., receive, transmit, store, drop, or process the data) at the network node(s) 140-*a*. Components of the control path 210 (e.g., the data handing monitor(s) 220) may monitor the handling of the data at the network node(s) 140-*a* and transmit at least one report relating to the handling of the data to the application server 230.

In some examples, one or more of the network node(s) 140-*a* may determine that a wireless device to which data is to be delivered is unreachable, and the S&F manager 215 may store the data at one or more of the network node(s) 140-*a* for a period of time (e.g., until the wireless device becomes reachable, or until a maximum time to store the data at the network node(s) 140-*a* is reached). If the wireless device that was unreachable becomes reachable, the S&F manager 215 may forward the stored data to the wireless device. Information pertaining to the storing and forwarding of the data may be collected by one or more of the data handling monitor(s) 220 and reported to the application server 230.

In some examples, components of the control path 210 may receive, from the application server 230, a data handling request applicable to data received from the application server 230. The data handling request may include, for example, a first indication of whether to store data at one or more of the network node(s) 140-*a*, prior to delivery of the data to a wireless device, when the wireless device to which the data is to be delivered is unreachable; a second indication of a maximum time to store data at one or more of the network node(s) 140-*a*; a maximum number of data packets to store at one or more of the network node(s) 140-*a* when the wireless device is unreachable; or a combination thereof.

In some examples, components of the control path 210 may receive, from the application server 230, a data handling monitoring request applicable to data received from the application server 230. The data handling monitoring request may indicate to one or more of the network node(s) 140-*a*, for example, that reports relating to data handling at the network node(s) 140-*a* should be provided to the application server 230, or that a certain type or types of information (or reports) should be provided to the application server 230.

In some examples, the information transmitted to the application server 230 in the at least one report relating to the handling of data at the network node(s) 140-*a* may include, for example, a first indication of data packets received at one or more of the network node(s) 140-*a*; a second indication of data packets stored at one or more of the network node(s) 140-*a*; a third indication of an expected data packet storage time; a fourth indication of a maximum data packet storage time; a fifth indication of a number of data packets queued for delivery to at least one wireless device; a sixth indication of data packets forwarded to at least one wireless device; a seventh indication of data packets dropped at a core network (e.g., data packets dropped by the S&F manager 215 because of expiration of a maximum data packet storage time); an eighth indication of data packets dropped in the RAN 240; a ninth indication of data packets successfully received by at least one wireless device; or a combination thereof.

Figure 3:
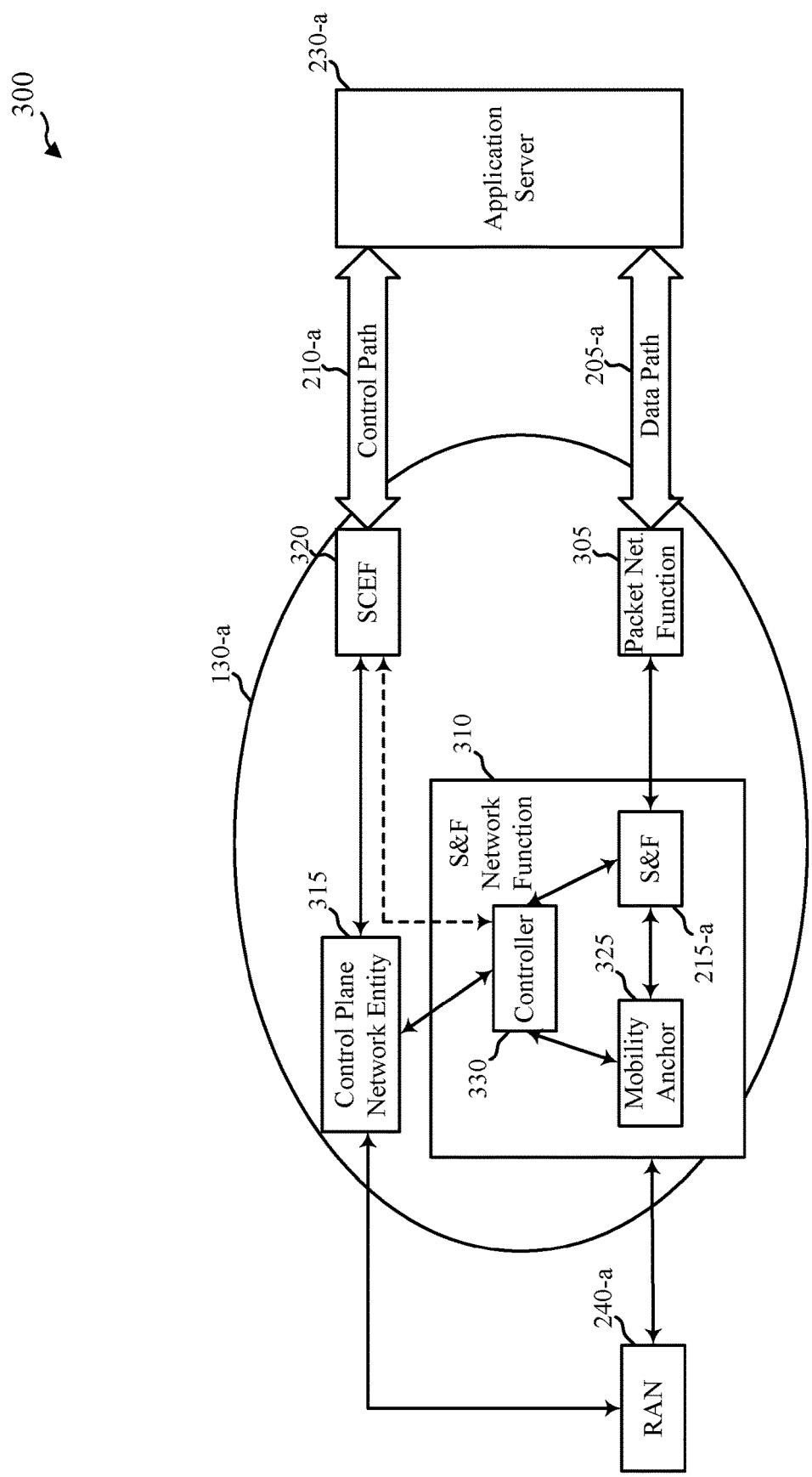
FIG. 3 shows an example architecture of a core network, in accordance with one or more aspects of the present disclosure.

FIG. 3 shows an example architecture 300 of a core network 130-*a* (e.g., a plurality of network nodes), in accordance with one or more aspects of the present disclosure. The core network 130-*a* is an example of aspects of the core network 130-*a* described with reference to FIG. 1. The core network 130-*a* may include a data path 205-*a* and a control path 210-*a* (also referred to as a user plane path 205-*a* and a control plane path 210-*a*, respectively).

The core network 130-*a* may include a packet network function 305 (e.g., a packet gateway (P-GW)) to provide an interface between the core network 130-*a* and other packet data networks, a S&F network function 310 providing S&F functionality (e.g., a serving gateway (S-GW), a SMF, a UPF, etc.), a control plane network entity 315 such as a mobility management entity (MME), or another network function with control plane functionality (e.g., an AMF), and a Service Capability Exposure Functionality (SCEF) server 320. The S&F network function 310 may include a store and forward (S&F) manager 215-*a*, a mobility anchor 325, and a controller 330. In some examples, the packet network function 305, the S&F manager 215-*a*, and the mobility anchor 325 may define portions of the data path 205-*a*, and the SCEF server 320, the control plane network entity 315, and the controller 330 may define portions of the control path 210-*a*. In some examples, the core network 130-*a* may define a network node, or one or more of the packet network function 305, the S&F network function 310, the control plane network entity 315, or the SCEF server 320 may each define one or more network nodes. In some examples, the S&F network function 310, another S&F network function, or another network node may be located outside of the core network 130-*a* (e.g., between the core network 130-*a* and a RAN 240-*a*).

An application server 230-*a* may communicate with wireless devices (e.g., UEs) connected to the RAN 240-*a* via the core network 130-*a*. The application server 230-*a* may communicate with the core network 130-*a* on a user plane (e.g., over the data path 205-*a*) and a control plane (e.g., over the control path 210-*a*). For example, the application server 230-*a* may transmit data that is to be delivered to at least one wireless device over the data path 205-*a* to the packet network function 305. The packet network function 305 may transmit the data to the S&F network function 310. When a wireless device of the at least one wireless device is available (e.g., in a Connected Mode), the S&F network function 310 may forward the data to the RAN 240-*a*, via the mobility anchor 325, for delivery to the at least one wireless device. When a wireless device of the at least one wireless device is not available, the S&F manager 215-*a* may cause the data to be stored at the core network 130-*a* (e.g., at the S&F network function 310, or any other network function with S&F functionality, such as SMF, UPF, etc.).

The controller 330 may monitor the handling of data at the core network 130-*a*, and in some examples may monitor the S&F manager 215-*a* and the mobility anchor 325. The controller 330 may also monitor the RAN 240-*a* and/or communications between the core network 130-*a* (or S&F network function 310) and the RAN 240-*a* (e.g., by subscribing to monitoring events provided by the RAN 240-*a*). The control plane network entity 315 may also monitor the handling of data at the core network 130-*a* (e.g., at the S&F network function 310), and may monitor the RAN 240-*a* and/or communications between the core network 130-*a* and the RAN 240-*a* (e.g., by subscribing to monitoring events provided by the RAN 240-*a*). In some examples, the controller 330, control plane network entity 315, and/or any other network function with control plane functionality (e.g., an AMF or SMF) may collect information associated with the handling of data at the core network 130-*a* and forward the collected information (a report relating to the handling of data at the core network 130-*a*) to the application server 230-*a* via the SCEF server 320. In some examples, the SCEF server 320 may provide an Application Program Interface (API) to the application server 230-*a*, enabling the application server 230-*a* to communicate with the core network 130-*a*.

Furthermore, in some examples, the controller 330 may collect information associated with the handling of data at the core network 130-*a* and forward the collected information to a control plane network entity, such as the control plane network entity 315, or any other network function with control plane functionality (e.g., an AMF). In these latter examples, the control plane network entity 315 or the control plane network function, may forward the information received from the controller 330 to the application server 230-*a* via the SCEF server 320. The information may be forwarded with or without additional information collected by the control plane network entity 315 or the control plane network function.

The information relating to the handling of data at the core network 130-*a* may include, for example, a first indication of data packets received at the core network 130-*a* (e.g., at the S&F network function 310-*a*); a second indication of data packets stored at the core network 130-*a* (e.g., at the S&F network function 310-*a*); a third indication of an expected data packet storage time; a fourth indication of a maximum data packet storage time; a fifth indication of a number of data packets queued for delivery to at least one wireless device; a sixth indication of data packets forwarded to at least one wireless device; a seventh indication of data packets dropped in the core network 130-*a* (e.g., data packets dropped by the S&F manager 215-*a* because of expiration of a maximum data packet storage time); an eighth indication of data packets dropped in the RAN 240-*a*; a ninth indication of data packets successfully received by at least one wireless device; or a combination thereof. The information relating to the handling of data at the core network 130-*a* may be collected per wireless device (e.g., per UE) and access point name (APN).

In some examples, the application server 230-*a* may transmit a data handling request or data handling monitoring request to the SCEF server 320 on the control plane. The data handling request may include, for example, a first indication of whether to store data at the core network 130-*a*, prior to delivery of the data to a wireless device, when the wireless device to which the data is transmitted is unreachable; a second indication of a maximum time to store data at the core network 130-*a*; a maximum number of data packets to store at the core network 130-*a*; or a combination thereof. In some examples, one or more of the decision to store data at the core network 130-*a*, the maximum time to store data, or the maximum number of data packets to store at the core network 130-*a* may be based on a parameter (or set of parameters) of the core network 130-*a*.

In some examples, the S&F network function 310 or S&F manager 215-*a* may control whether the S&F network function 310 or S&F manager 215-*a* stores data packets at the core network 130-*a*, and/or may control the maximum time to store data or the maximum number of data packets to store. In some examples, the control plane network entity 315 may control whether the S&F network function 310 or S&F manager 215-*a* stores data packets at the core network 130-*b*, and may indicate to the S&F network function 310 or S&F manager 215-*a* the maximum time to store data or the maximum number of data packets to store. In either set of examples, the control plane network entity 315 or S&F network function 310 may or may not receive data handling parameters (e.g., an indication of whether to store data at the core network 130-*a*, a maximum time to store data, or a maximum number of data packets to store) from the SCEF server 320. In some examples, store and forward data handling parameters may be based at least in part on available memory for storing data at the core network 130-*a*, or on a traffic load of the core network 130-*a*.

In some examples, a data handling monitoring request may indicate that the application server 230-*a* is subscribing to reports relating to the handling of data at the core network 130-*a*. In some examples, a data handling monitoring request may indicate a type or types of information (or reports) that the application server 230-*a* wants to receive.

The SCEF server 320 may transmit reports relating to the handling of data at the network node, to the application server 230-*a*, on demand, periodically, in response to a trigger event, or a combination thereof. In some examples, the SCEF server 320 may transmit the reports reactively, when the reports are received from the S&F network function 310, control plane network entity 315, or a control plane network function, such as an AMF. In some examples, the SCEF server 320 may subscribe (e.g., with the S&F network function 310 or control plane network entity 315) to receive information related to data handling from the S&F network function 310 or control plane network entity 315. In some examples, the SCEF server 320 may request reports from the S&F network function 310 or control plane network entity 315. In some examples, the SCEF server 320 may provide an API to the application server, enabling the application server to communication with the core network 130-*a*.

When a report relating to data handling at the core network 130-*a* is to include an indication of data packets successfully received by at least one wireless device, the S&F network function 310 or control plane network entity 315 may subscribe (e.g., with the RAN 240-*a*) to receive such information from the RAN 240-*a*.

Figure 4:
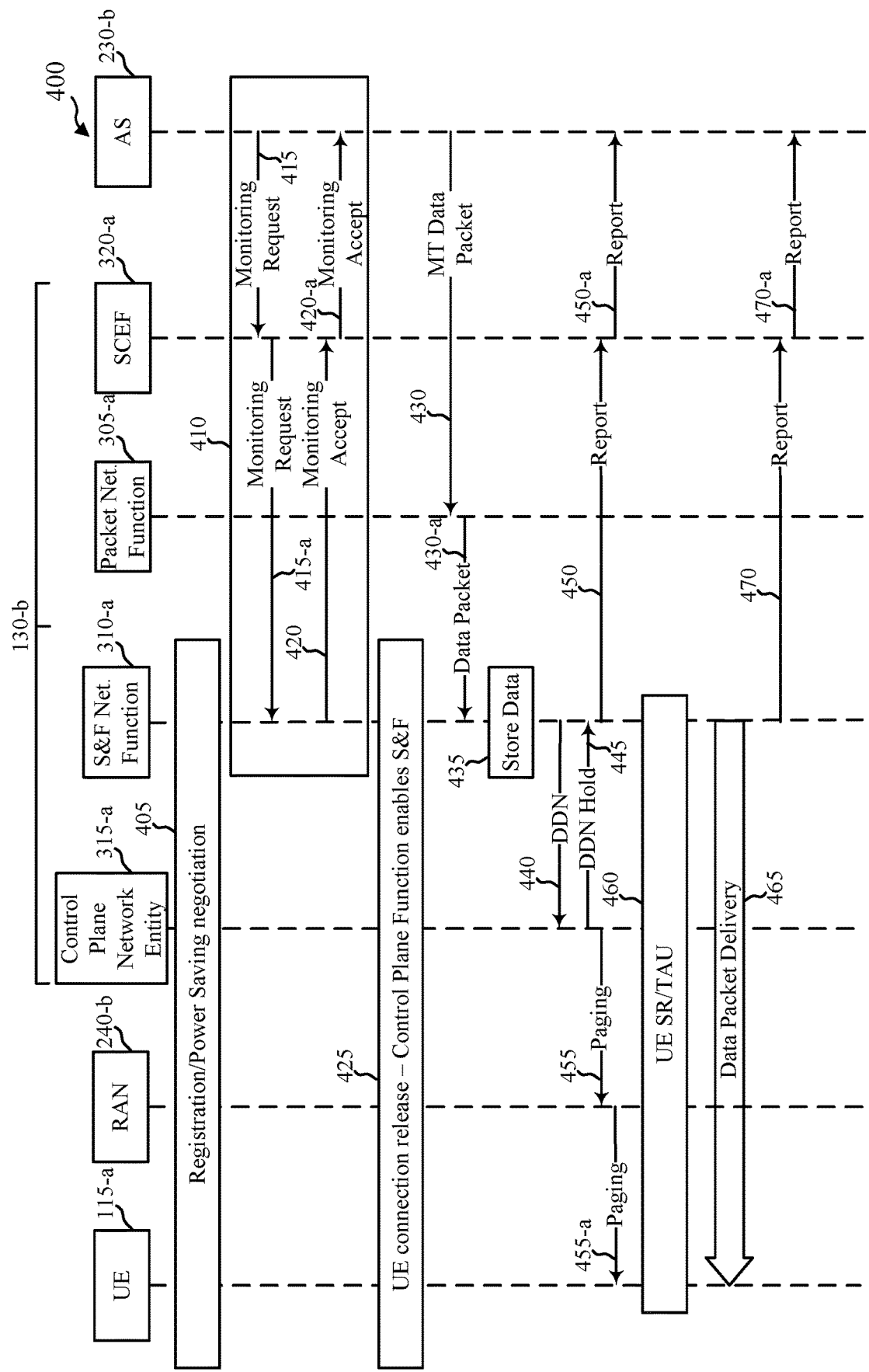
FIG. 4 shows a message flow for monitoring data handling at a core network, directly via a network function with store and forward functionality such as a serving gateway (S-GW) (i.e., without transmitting information collected at the S-GW through a mobility management entity (MME)), in accordance with one or more aspects of the present disclosure.

FIG. 4 shows a message flow 400 for monitoring data handling at a core network 130-*b*, directly via a S&F network function 310-*a* (i.e., without transmitting information collected at the S&F network function 310-*a* through a control plane network entity 315-*a*), in accordance with one or more aspects of the present disclosure. By way of example, the message flow 400 occurs between a UE 115-*a*, a RAN 240-*b*, the control plane network entity 315-*a* (e.g., MME, AMF, amongst other examples of network functions with control plane functionality), the S&F network function 310-*a* (e.g., S-GW, SMF or UPF, amongst other examples of network functions providing S&F functionality), a packet network function 305-*a* (e.g., a P-GW), a SCEF server 320-*a*, and an application server (AS) 230-*b*. As shown, the control plane network entity 315-*a*, S&F network function 310-*a*, packet network function 305-*a*, and SCEF server 320-*a* may be part of the core network 130-*b*. The UE 115-*a* is an example of aspects of the UEs 115 described with reference to FIG. 1. The RAN 240-*b*, control plane network entity 315-*a*, S&F network function 310-*a*, packet network function 305-*a*, SCEF server 320-*a*, and AS 230-*b* are examples of aspects of the RAN 240, control plane network entity 315, S&F Network Function 310, packet network function 305, SCEF server 320, and application server 230 described with reference to FIG. 2 or 3. For purposes of this description, each of the packet network function 305-*a*, S&F network function 310-*a*, control plane network entity 315-*a*, and SCEF server 320-*a* may be provided by one or more network nodes, or by the same or different network nodes.

At 405, the UE 115-*a* may register with the RAN 240-*b* and negotiate a power saving mode with the RAN 240-*b*, control plane network entity 315-*a*, and/or S&F network function 310-*a*.

At 410, data handling monitoring may be configured for the AS 230-*b*. In some examples, configuration of the data handling monitoring may begin with the AS's transmission of a data handling monitoring request (e.g., a Monitoring Request message) to the SCEF server 320-*a* (e.g., at 415). At 415-*a*, the SCEF server 320-*a* may forward the data handling monitoring request (e.g., the Monitoring Request message, or parameters thereof, or a request based at least in part thereon) to the S&F network function 310-*a*, to subscribe to reports from the S&F network function 310-*a* related to data handling at the core network 130-*b*. At 420, the S&F network function 310-*a* may return an acknowledgement of the data handling monitoring request (e.g., a Monitoring Accept message) to the SCEF server 320-*a*. At 420-*a*, the SCEF server 320-*a* may forward the acknowledgement (e.g., the Monitoring Accept message, or an acknowledgement based at least in part thereon) to the AS 230-*b*.

At 425, the UE 115-*a* may release its connection with the network (e.g., transition from a Connected Mode to an Idle Mode or PSM), and the control plane network entity 315-*a* may enable store and forward (S&F) functionality for data transmitted to the UE 115-*a*.

At 430, the AS 230-*b* may transmit a MT data packet to the UE 115-*a*. The MT data packet may be received at the packet network function 305-*a* at 430, and transmitted to the S&F network function 310-*a* at 430-*a*. At 435, the S&F network function 310-*a* may store the data packet; and at 440, the S&F network function 310-*a* may transmit a DDN to the control plane network entity 315-*a*. Because the UE 115-*a* released its connection with the network at 425, the control plane network entity 315-*a* may return a DDN Hold message to the S&F network function 310-*a* at 445. At 450, the S&F network function 310-*a* may transmit, to the SCEF server 320-*a*, a report indicating that the data packet is stored at the core network 130-*b*; and at 450-*a*, the SCEF server 320-*a* may transmit the report (or a report based thereon) to the AS 230-*b*.

At 455, the control plane network entity 315-*a* may transmit a paging message to the UE 115-*a* in accordance with a sleep cycle or extended DRX cycle of the UE 115-*a*.

At 455-*a*, the paging message may be received by the RAN 240-*b* and forwarded to the UE 115-*a*.

At or before 460, the UE 115-*a* may wake up or otherwise enter a Connected Mode with the network. While connected to the network, the UE 115-*a* may receive the paging message transmitted at 455-*a*, and in some examples may transmit a scheduling request (SR), tracking area update (TAU), or other message to the RAN 240-*b*. In response to receiving an indication that the UE 115-*a* is in Connected Mode, the control plane network entity 315-*a* may indicate to the S&F network function 310-*a* that stored data may be transmitted to the UE 115-*a*. At 465, the S&F network function 310-*a* may transmit the data stored at 435 to the UE 115-*a*. In some examples, the S&F network function 310-*a* may also or alternatively transmit, to the UE 115-*a*, other data stored or received for transmission to the UE 115-*a*.

At 470, the S&F network function 310-*a* may transmit, to the SCEF server 320-*a*, another report. The report may indicate that the data packet was forwarded to the UE 115-*a*, or that the data packet was successfully received by the UE 115-*a* (when information on successful delivery is received from the UE 115-*a* or RAN 240-*b*. The SCEF server 320-*a* may transmit the report (or a report based thereon) to the AS 230-*b* at 470-*a*.

In some examples, reports transmitted by the S&F network function 310-*a*, such as the reports transmitted at 450 and 470, may be based at least in part on information relating to data packets received at the core network 130-*b* (e.g., at the S&F network function 310-*a*); information relating to data packets stored at the core network 130-*b* (e.g., at the S&F network function 310-*a*); information relating to one or more expected data packet storage times; information relating to one or more maximum data packet storage times; information relating to numbers of data packets queued for delivery to wireless devices; information relating to data packets forwarded to wireless devices; information relating to data packets dropped in the core network 130-*b*; information relating to data packets dropped in the RAN; or combinations thereof. In some examples, reports transmitted by the S&F network function 310-*a* may also or alternatively be based on information collected by the RAN 240-*b* and provided to the S&F network function 310-*a*, such as information relating to data packets successfully received by wireless devices.

In some examples, the messages transmitted and operations performed during the message flow 400 may be performed in other orders, or may include other or different messages or operations.

Figure 5:
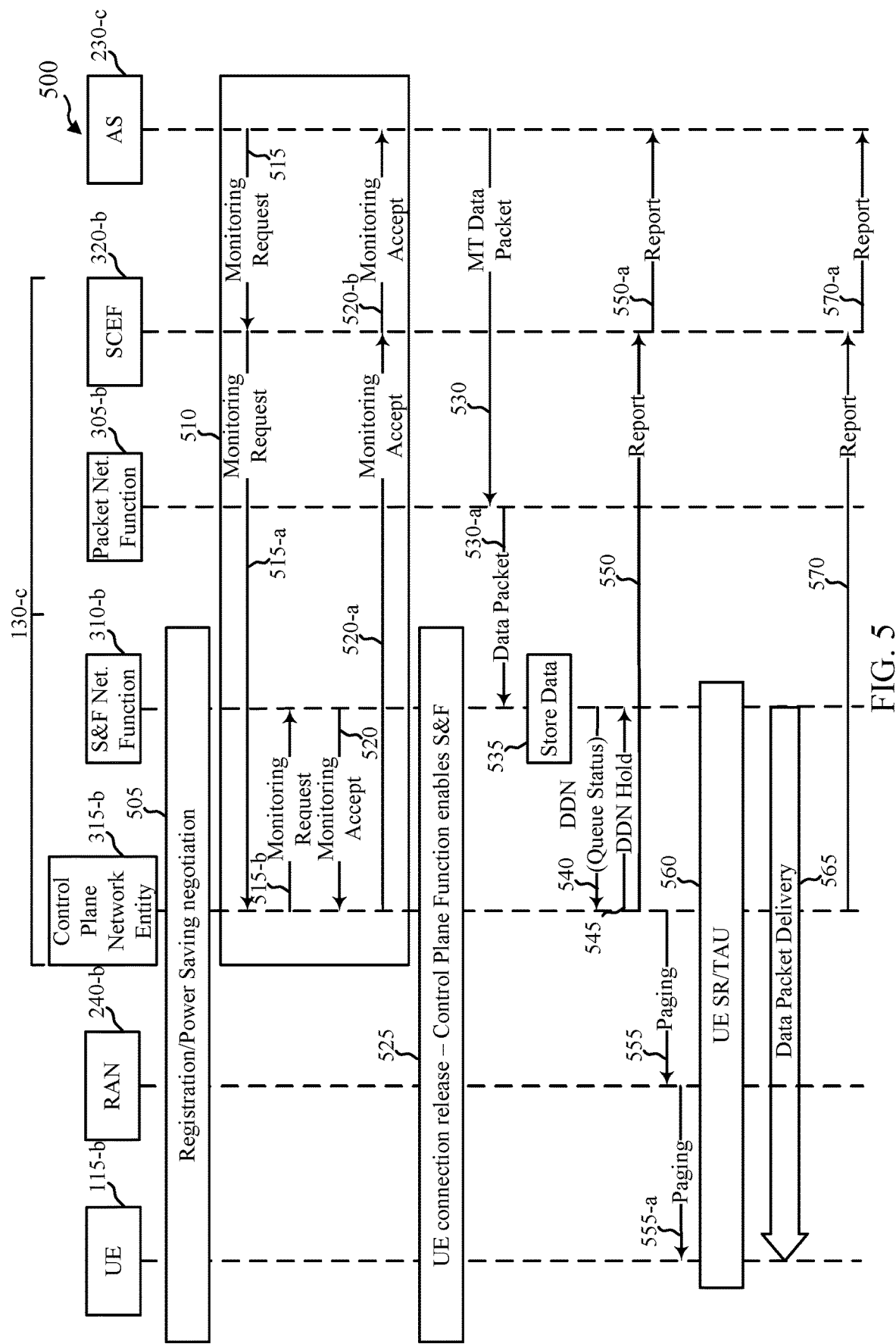
FIG. 5 shows a message flow for monitoring data handling at a core network, through a control plane network entity 315-b, in accordance with one or more aspects of the present disclosure.

FIG. 5 shows a message flow 500 for monitoring data handling at a core network 130-*c*, through a control plane network entity 315-*b*, in accordance with one or more aspects of the present disclosure. By way of example, the message flow 500 occurs between a UE 115-*b*, a RAN 240-*b*, the control plane network entity 315-*b* (e.g., MME, AMF, amongst some examples of network functions with control plane functionality), the S&F network function 310-*b* (e.g., S-GW, SMF or UPF, amongst some examples of network functions providing S&F functionality), a packet network function 305-*b* (e.g., a P-GW), a SCEF server 320-*b*, and an AS 230-*c*. As shown, the control plane network entity 315-*b*, S&F network function 310-*b*, packet network function 305-*b*, and SCEF server 320-*b* may be part of the core network 130-*c*. The UE 115-*b* is an example of aspects of the UEs 115 described with reference to FIG. 1 or 4. The RAN 240-*c*, control plane network entity 315-*b*, S&F network function 310-*b*, packet network function 305-*b*, SCEF server 320-*b*, and AS 230-*c* are examples of aspects of the RAN 240, control plane network entity 315, S&F network function 310, packet network function 305, SCEF server 320, and application server 230 described with reference to FIG. 2, 3, or 4. For purposes of this description, each of the packet network function 305-*b*, S&F network function 310-*b*, control plane network entity 315-*b*, and SCEF server 320-*b* may be provided by one or more network nodes, or by the same or different network nodes.

At 505, the UE 115-*b* may register with the RAN 240-*c* and negotiate a power saving mode with the RAN 240-*b*, control plane network entity 315-*b*, and/or S&F network function 310-*b*.

At 510, data handling monitoring may be configured for the AS 230-*c*. In some examples, configuration of the data handling monitoring may begin with the AS's transmission of a data handling monitoring request (e.g., a Monitoring Request message) to the SCEF server 320-*b* (e.g., at 515). At 515-*a*, the SCEF server 320-*b* may forward the data handling monitoring request (e.g., the Monitoring Request message, or parameters thereof, or a request based at least in part thereon) to the control plane network entity 315-*b*, to subscribe to reports from the control plane network entity 315-*b* related to data handling at the core network 130-*c*. At 515-*b*, the control plane network entity 315-*b* may forward the data handling monitoring request (e.g., the Monitoring Request message, or parameters thereof, or a request based at least in part thereon) to the S&F network function 310-*b*, to subscribe to reports from the S&F network function 310-*b* related to data handling at the core network 130-*c*. At 520, the S&F network function 310-*b* may return an acknowledgement of the data handling monitoring request (e.g., a Monitoring Accept message) to the control plane network entity 315-*b*. At 520-*a*, the control plane network entity 315-*b* may forward the Monitoring Accept message (or an acknowledgement based at least in part thereon) to the SCEF server 320-*b*. At 520-*b*, the SCEF server 320-*b* may forward the acknowledgement (e.g., the Monitoring Accept message, or an acknowledgement based at least in part thereon) to the AS 230-*c*.

At 525, the UE 115-*b* may release its connection with the network (e.g., transition from a Connected Mode to an Idle Mode or PSM), and the control plane network entity 315-*b* may enable S&F functionality for data transmitted to the UE 115-*b*.

At 530, the AS 230-*c* may transmit a MT data packet to the UE 115-*b*. The MT data packet may be received at the packet network function 305-*b* at 530, and transmitted to the S&F network function 310-*b* at 530-*b*. At 535, the S&F network function 310-*b* may store the data packet; and at 540, the S&F network function 310-*b* may transmit a DDN with a queue status (i.e., data packet queue status) to the control plane network entity 315-*b*. Because the UE 115-*b* released its connection with the network at 525, the control plane network entity 315-*b* may return a DDN Hold message to the S&F network function 310-*b* at 545. At 550, the control plane network entity 315-*b* may transmit, to the SCEF server 320-*b*, a report indicating that the data packet is stored at the core network 130-*c*; and at 550-*b*, the SCEF server 320-*b* may transmit the report (or a report based thereon) to the AS 230-*c*. In some examples, the DDN Hold message transmitted at 545 may include a data handling monitoring request pertaining to the data stored at 535.

At 555, the control plane network entity 315-*b* may transmit a paging message to the UE 115-*b* in accordance with a sleep cycle or extended DRX cycle of the UE 115-*b*. At 555-*b*, the paging message may be received by the RAN 240-*c* and forwarded to the UE 115-*b*.

At or before 560, the UE 115-*b* may wake up or otherwise enter a Connected Mode with the network. While connected to the network, the UE 115-*b* may receive the paging message transmitted at 555-*b*, and in some examples may transmit a SR, TAU, or other message to the RAN 240-*c*. In response to receiving an indication that the UE 115-*b* is in Connected Mode, the control plane network entity 315-*b* may indicate to the S&F network function 310-*b* that stored data may be transmitted to the UE 115-*b*. At 565, the S&F network function 310-*b* may transmit the data stored at 535 to the UE 115-*b*. In some examples, the S&F network function 310-*b* may also or alternatively transmit, to the UE 115-*b*, other data stored or received for transmission to the UE 115-*b*.

At 570, the control plane network entity 315-*b* may transmit, to the SCEF server 320-*b*, another report relating to the handling of data at the core network 130-*c*. The report may indicate that the data packet was forwarded to the UE 115-*b*, or that the data packet was successfully received by the UE 115-*b* (when information on successful delivery is received from the UE 115-*b* or RAN 240-*c*. The SCEF server 320-*b* may transmit the report (or a report based thereon) to the AS 230-*c* at 570-*a*.

In some examples, reports transmitted by the control plane network entity 315-*b*, such as the reports transmitted at 550 and 570, may be based at least in part on information collected by the S&F network function 310-*b* and transmitted to the control plane network entity 315-*b*. The collected information may include, for example, information relating to data packets received at the network node 140-*b* (e.g., at the S&F network function 310-*b*); information relating to data packets stored at the network node 140-*b* (e.g., at the S&F network function 310-*b*); information relating to one or more expected data packet storage times; information relating to one or more maximum data packet storage times; information relating to numbers of data packets queued for delivery to wireless devices; information relating to data packets forwarded to wireless devices; information relating to data packets dropped in the core network 130-*c*; information relating to data packets dropped in the RAN; or combinations thereof.

In some examples, reports transmitted by the control plane network entity 315-*b* may also or alternatively be based on information collected by the control plane network entity 315-*b*, such as information relating to one or more expected data packet storage times, or information relating to one or more maximum data packet storage times. In some examples, reports transmitted by the control plane network entity 315-*b* may also or alternatively be based on information collected by the RAN 240-*c* and provided to the control plane network entity 315-*b*, such as information relating to data packets successfully received by wireless devices. Reports transmitted by the control plane network entity 315-*b* may also or alternatively be based on information inferred by the control plane network entity 315-*b*. For example, the control plane network entity 315-*b* may infer that a data packet is dropped upon expiration of a maximum data packet storage time.

In some examples, the messages transmitted and operations performed during the message flow 500 may be performed in other orders, or may include other or different messages or operations.

Figure 6:
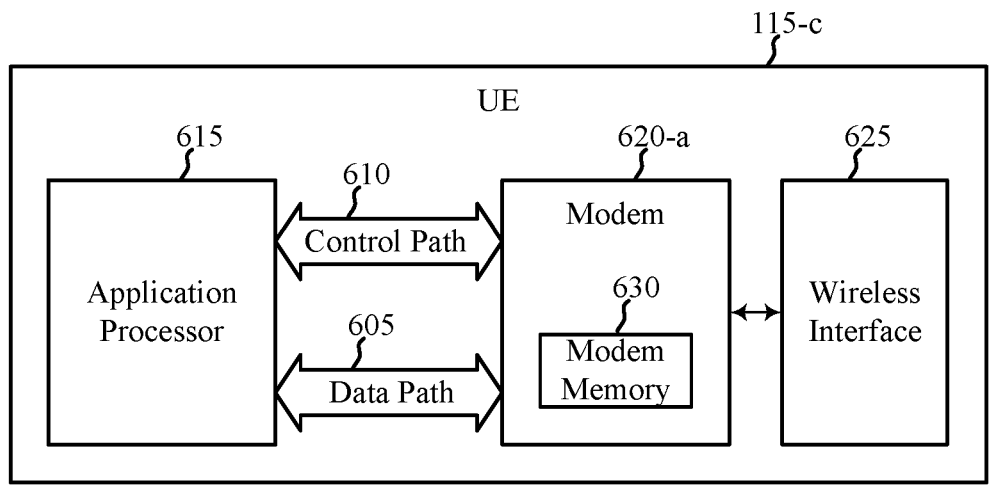
FIG. 6 shows an example architecture of a wireless device (e.g., a UE), in accordance with one or more aspects of the present disclosure.

FIG. 6 shows an example architecture 600 of a wireless device (e.g., a UE 115-*c*), in accordance with one or more aspects of the present disclosure. The UE 115-*c* is an example of aspects of the UE 115 described with reference to FIG. 1, 4, or 5. The UE 115-*c* may include an application processor 615 and a modem 620-*a*. The modem 620-*a* may be coupled to a wireless interface 625 including one or more transceivers and antennas through which data and control information may be transmitted or received over a radio frequency spectrum (e.g., to a network node 140 or core network 130). The components of the UE 115-*c* (including components of the application processor 615 and modem 620-*a*) may define a data path 605 and a control path 610 (also referred to as a user plane path 605 and a control plane path 610). The data path 605 and control path 610 may respectively enable the transmission of data and control information (or signals) between the application processor 615 and the modem 620-*a*.

In some examples, the application processor 615 may transmit, to the modem 620-*a*, a request to receive at least one report on events monitored at the modem. The request may be transmitted via the control path 610, and may be transmitted prior to or with a data transmission over the data path 605. The request may indicate to the modem 620-*a*, for example, that reports relating to modem events should be transmitted to the application processor 615, or that a certain type or types of information (or reports) should be transmitted to the application processor 615.

In response to receiving the request from the application processor 615 (or proactively, in the absence of a request), the modem 620-*a* may transmit at least one report (e.g., at least one status report) to the application processor 615. In some examples, the at least one report may include a modem status or a data packet status. The modem status may include, for example, a first indication of an expected wait time until the modem 620-*a* becomes active or ready to transmit; a second indication of a modem state transition from not active or not ready to transmit, to active; a third indication of a modem state transition from active to not active; or a combination thereof. The data packet status may include, for example, a first indication of data packets received and stored in a modem memory 630; a second indication of data packets queued at the modem 620-*a*; a third indication of data packets dropped by the modem 620-*a*; a fourth indication of data packets transmitted by the modem 620-*a*; a fifth indication of data packets successfully received by a device (e.g., a base station or network node) to which the modem 620-*a* transmits over the radio frequency spectrum; or a combination thereof. In some examples, the at least one report may be transmitted to the application processor 615 on demand, periodically, in response to a trigger event, or a combination thereof.

In some examples, the modem 620-*a* may receive data to transmit over a radio frequency spectrum (e.g., via the wireless interface 625) from the application processor 615. The data may be received over the data path 605. In some examples, the modem 620-*a* may receive an indication from the application processor 615 that the data is delay tolerant. The indication may be received over the data path 605 with the data, or over the control path 610 prior to receiving, with, or after receiving the data. In some examples, the modem 620-*a* may store the data received from the application processor 615 in the modem memory 630, based at least in part on receiving the indication that the data is delay tolerant. In some examples, the modem 620-*a* may transmit a report, to the application processor 615, indicating that the data is stored in the modem memory 630. The application processor 615 may also indicate to the modem 620-*a* when data to be transmitted is delay sensitive, in which case the modem 620-*a* may be configured to wake and transmit the delay sensitive data.

In some examples, the modem 620-*a* may determine that the modem 620-*a* is not active, and may store the data received from the application processor 615 in the modem memory 630 based at least in part on determining that the modem 620-*a* is not active. In some examples, the modem 620-*a* may transmit a report to the application processor 615 indicating that the modem 620-*a* is not active, and the application processor 615 may temporarily store data to be transmitted over a radio frequency spectrum in an application processor memory (not shown) or the modem memory 630. The modem 620-*a* may also transmit, to the application processor 615, a report that the data is stored in the modem memory 630.

When the modem 620-*a* become active, the modem 620-*a* may transmit the data stored in the modem memory 630 over the radio frequency spectrum. In some examples, transmission of the data may trigger the transmission of a report from the modem 620-*a* to the application processor 615.

Figure 7:
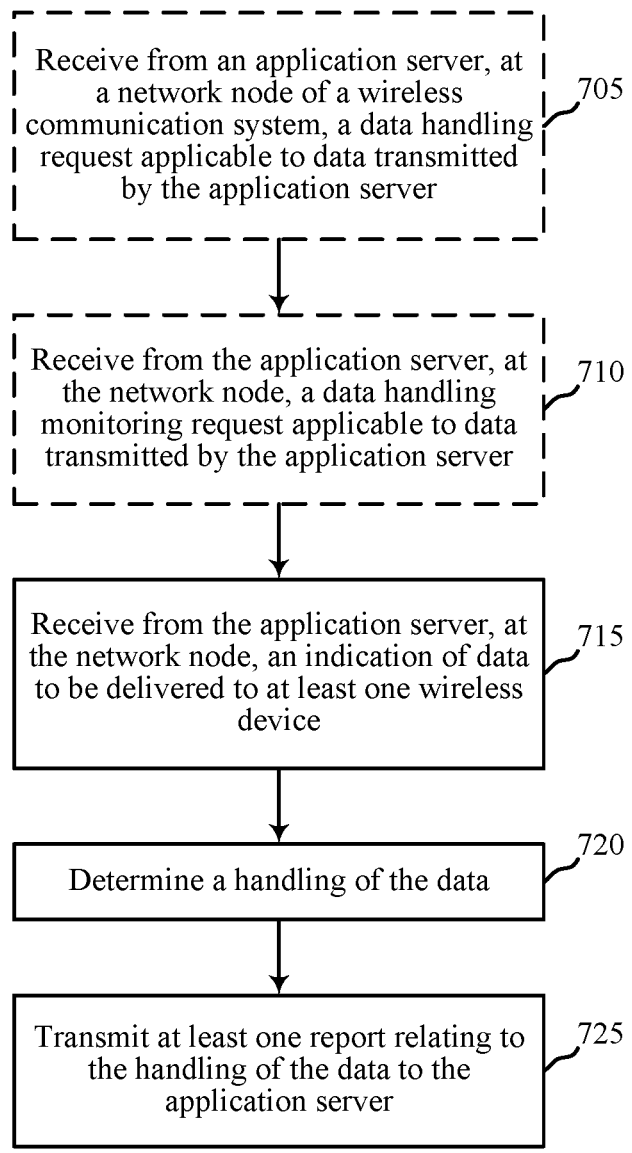
FIG. 7 is a flow chart illustrating an example of a method for wireless communication, in accordance with one or more aspects of the present disclosure.

FIG. 7 is a flow chart illustrating an example of a method 700 for wireless communication, in accordance with one or more aspects of the present disclosure. For clarity, the method 700 is described below with reference to aspects of a network node 140 (e.g., a S&F network function 310 or control plane network entity 315) described with reference to FIG. 1, 2, 3, 4, or 5. In some examples, one or more components of a network node 140 may execute one or more sets of codes to control the functional elements of the network node 140 to perform the functions described below. Additionally or alternatively, the component(s) of the network node 140 may perform one or more of the functions described below using special-purpose hardware.

At block 705, the method 700 may optionally include receiving from an application server, at a network node of a wireless communication system, a data handling request applicable to data transmitted by the application server. The operation(s) at block 705 may be performed by components of the control path 210 described with reference to FIG. 2 or 3, or the S&F Network Function 310 or control plane network entity 315 described with reference to FIG. 3, 4, or 5, or any other network function with S&F functionality (e.g., S-GW, SMF, UPF, etc.) or control plane functionality (e.g., MME, AMF, etc.).

At block 710, the method 700 may optionally include receiving from the application server, at the network node, a data handling monitoring request applicable to data transmitted by the application server. The operation(s) at block 710 may be performed by components of the control path 210 described with reference to FIG. 2 or 3, or the S&F network function 310 or control plane network entity 315 described with reference to FIG. 3, 4, or 5, or any other network function with S&F functionality (e.g., S-GW, SMF, UPF, etc.) or control plane functionality (e.g., MME, AMF, etc.).

At block 715, the method 700 may include receiving from the application server, at the network node, an indication of data to be delivered to at least one wireless device. The operation(s) at block 715 may be performed by components of the data path 205 described with reference to FIG. 2 or 3, or the S&F network function 310 or control plane network entity 315 described with reference to FIG. 3, 4, or 5, or any other network function with S&F functionality (e.g., S-GW, SMF, UPF, etc.) or control plane functionality (e.g., MME, AMF, etc.).

At block 720, the method 700 may include determining a handling of the data (e.g., a handling of the data at the network node performing the method 700, or a handling of the data at another network node (e.g., a node of a core network or a node that handles the data between the core network and a RAN). In some examples, the data may be handled according to a data handling request received at block 705. The operation(s) at block 720 may be performed by components of the data path 205 described with reference to FIG. 2 or 3, or the S&F network function 310 or control plane network entity 315 described with reference to FIG. 3, 4, or 5, or any other network function with S&F functionality (e.g., S-GW, SMF, UPF, etc.) or control plane functionality (e.g., MME, AMF, etc.).

At block 725, the method 700 may include transmitting, to the application server, at least one report relating to the handling of the data. In some examples, the at least one report may be based at least in part on a data handling monitoring request received at block 710. The operation(s) at block 725 may be performed by components of the data path 205 described with reference to FIG. 2 or 3, or the S&F network function 310 or control plane network entity 315 described with reference to FIG. 3, 4, or 5, or any other network function with S&F functionality (e.g., S-GW, SMF, UPF, etc.) or control plane functionality (e.g., MME, AMF, etc.).

In some examples of the method 700, the data handling request may include a first indication of whether to store the data, prior to delivery of the data to a wireless device of the at least one wireless device, when the wireless device is unreachable; a second indication of a maximum time to store the data when the wireless device is unreachable; a maximum number of data packets to store when the wireless device is unreachable; or a combination thereof.

In some examples of the method 700, the at least one report relating to the handling of the data includes a first indication of data packets received (e.g., at the network node performing the method 700, or at another network node); a second indication of data packets stored (e.g., at the network node or at another network node); a third indication of an expected data packet storage time; a fourth indication of a maximum data packet storage time; a fifth indication of a number of data packets queued for delivery to the at least one wireless device; a sixth indication of data packets forwarded to the at least one wireless device; a seventh indication of data packets dropped at a core network; an eighth indication of data packets dropped in a RAN coupling the core network to the at least one wireless device; a ninth indication of data packets successfully received by the at least one wireless device; or a combination thereof.

In some examples of the method 700, the at least one report relating to the handling of the data may be transmitted to the application server on demand, periodically, in response to a trigger event, or a combination thereof.

In some examples of the method 700, transmitting the at least one report, at block 725, may include collecting information associated with the handling of the data at a serving gateway, and forwarding the collected information to the application server via a SCEF server.

In some examples of the method 700, transmitting the at least one report, at block 725, may include collecting information associated with the handling of the data from a serving gateway, at a MME, SMF, or AMF, and forwarding the collected information from the MME to the application server via a SCEF server. In these examples, the MME may add information to the collected information before forwarding the collected information from the MME to the application server via the SCEF server.

Figure 8:
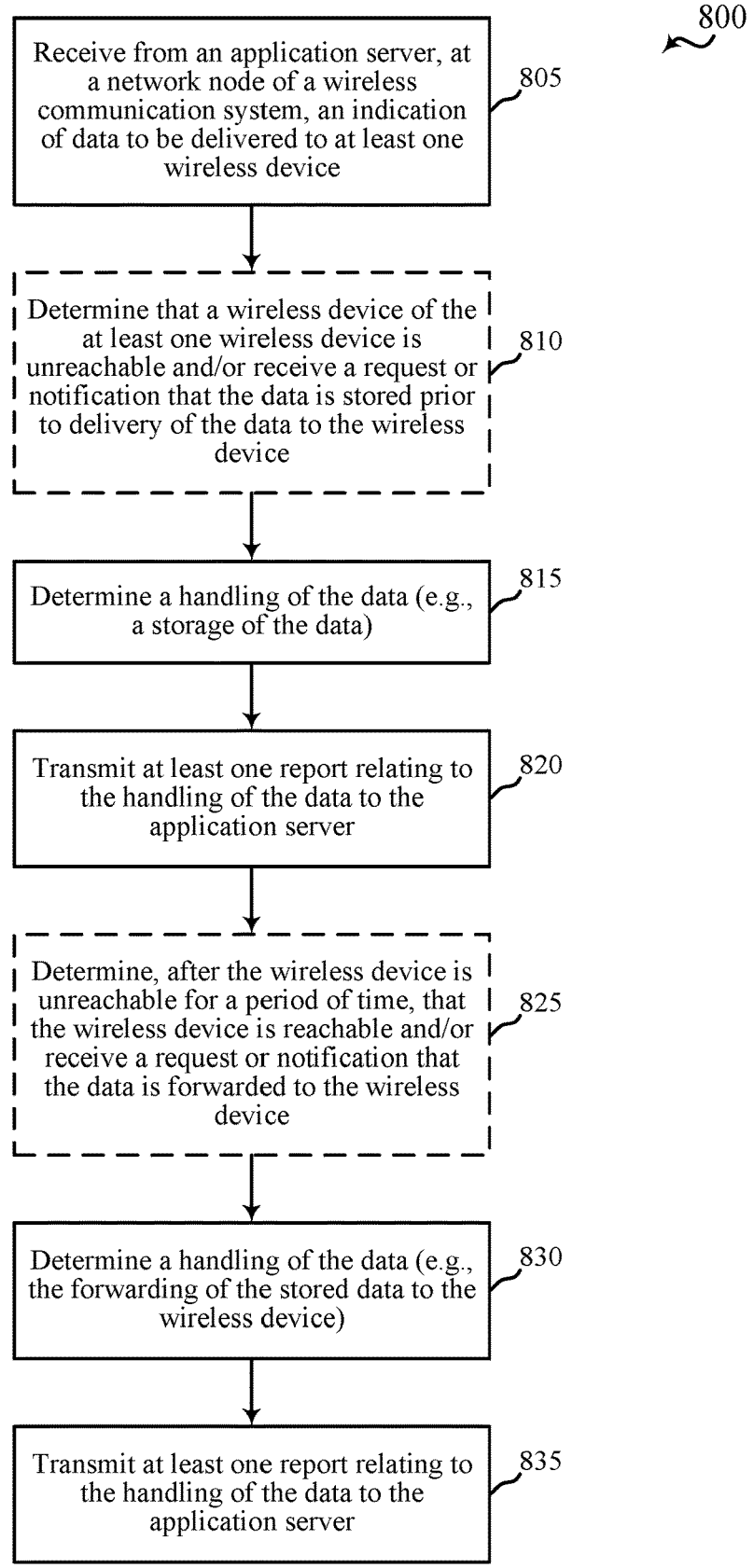
FIG. 8 is a flow chart illustrating an example of a method for wireless communication, in accordance with one or more aspects of the present disclosure.

FIG. 8 is a flow chart illustrating an example of a method 800 for wireless communication, in accordance with one or more aspects of the present disclosure. For clarity, the method 800 is described below with reference to aspects of a network node 140 (e.g., a S&F network function 310 or control plane network entity 315) described with reference to FIG. 1, 2, 3, 4, or 5. In some examples, one or more components of a network node 140 may execute one or more sets of codes to control the functional elements of the network node 140 to perform the functions described below. Additionally or alternatively, the component(s) of the network node 140 may perform one or more of the functions described below using special-purpose hardware.

At block 805, the method 800 may include receiving from an application server, at a network node of a wireless communication system, an indication of data to be delivered to at least one wireless device. The operation(s) at block 805 may be performed by components of the data path 205 described with reference to FIG. 2 or 3, or the S&F network function 310 or control plane network entity 315 described with reference to FIG. 3, 4, or 5, or any other network function with S&F functionality (e.g., S-GW, SMF, UPF, etc.) or control plane functionality (e.g., MME, AMF, etc.).

At block 810, the method 800 may optionally include determining that a wireless device of the at least one wireless device is unreachable. Additionally or alternatively, the operation(s) at block 810 may include receiving a request to store the data received at block 805 (e.g., receiving a request from a MME at a S-GW) or receiving a notification that the data received at block 805 is stored (e.g., receiving a notification from a S-GW at a MME). The operation(s) at block 810 may be performed by components of the control path 210 described with reference to FIG. 2 or 3, or the S&F network function 310 or control plane network entity 315 described with reference to FIG. 3, 4, or 5, or any other network function with S&F functionality (e.g., S-GW, SMF, UPF, etc.) or control plane functionality (e.g., MME, AMF, etc.).

At block 815, the method 800 may include determining a handling of the data (e.g., a handling of the data at the network node performing the method 800, or a handling of the data at another network node (e.g., a node of a core network or a node that handles the data between the core network and a RAN). In some examples, the determined handling of the data may include a storage of the data prior to delivery of the data to a wireless device of the at least one wireless device. In some examples, the data may be stored because the wireless device is unreachable, as determined at block 810. The operation(s) at block 815 may be performed by components of the data path 205 described with reference to FIG. 2 or 3, or the S&F network function 310 or control plane network entity 315 described with reference to FIG. 3, 4, or 5, or any other network function with S&F functionality (e.g., S-GW, SMF, UPF, etc.) or control plane functionality (e.g., MME, AMF, etc.).

At block 820, the method 800 may include transmitting, to the application server, at least one report relating to the handling of the data. In some examples, the at least one report may be based at least in part on a storage of the data determined at block 815. The operation(s) at block 820 may be performed by components of the data path 205 described with reference to FIG. 2 or 3, or the S&F network function 310 or control plane network entity 315 described with reference to FIG. 3, 4, or 5, or any other network function with S&F functionality (e.g., S-GW, SMF, UPF, etc.) or control plane functionality (e.g., MME, AMF, etc.).

At block 825, the method 800 may optionally include determining, after the wireless device is unreachable for a period of time, that the wireless device is reachable. Additionally or alternatively, the operation(s) at block 825 may include receiving a request to forward stored data to a wireless device (e.g., receiving a request from a MME at a S-GW) or receiving a notification that stored data has been forwarded to a wireless device (e.g., receiving a notification from a S-GW at a MME). The operation(s) at block 825 may be performed by components of the control path 210 described with reference to FIG. 2 or 3, or the S&F network function 310 or control plane network entity 315 described with reference to FIG. 3, 4, or 5, or any other network function with S&F functionality (e.g., S-GW, SMF, UPF, etc.) or control plane functionality (e.g., MME, AMF, etc.).

At block 830, the method 800 may include determining a handling of the data (e.g., a handling of the data at the network node performing the method 800, or a handling of the data at another network node (e.g., a node of a core network or a node that handles the data between the core network and a RAN). In some examples, the determined handling of the data may include a forwarding of stored data to a wireless device of the at least one wireless device. The operation(s) at block 830 may be performed by components of the data path 205 described with reference to FIG. 2 or 3, or the S&F network function 310 or control plane network entity 315 described with reference to FIG. 3, 4, or 5, or any other network function with S&F functionality (e.g., S-GW, SMF, UPF, etc.) or control plane functionality (e.g., MME, AMF, etc.).

At block 835, the method 800 may include transmitting, to the application server, at least one report relating to the handling of the data. In some examples, the at least one report may be based at least in part on the forwarding of the data determined at block 830. The operation(s) at block 835 may be performed by components of the data path 205 described with reference to FIG. 2 or 3, or the S&F network function 310 or control plane network entity 315 described with reference to FIG. 3, 4, or 5, or any other network function with S&F functionality (e.g., S-GW, SMF, UPF, etc.) or control plane functionality (e.g., MME, AMF, etc.).

In some examples of the method 800, the at least one report relating to the handling of the data includes a first indication of data packets received (e.g., at the network node performing the method 800, or at another network node); a second indication of data packets stored (e.g., at the network node or at another network node); a third indication of an expected data packet storage time; a fourth indication of a maximum data packet storage time; a fifth indication of a number of data packets queued for delivery to the at least one wireless device; a sixth indication of data packets forwarded to the at least one wireless device; a seventh indication of data packets dropped at a core network; an eighth indication of data packets dropped in a RAN coupling the core network to the at least one wireless device; a ninth indication of data packets successfully received by the at least one wireless device; or a combination thereof.

In some examples of the method 800, the at least one report relating to the handling of the data may be transmitted to the application server on demand, periodically, in response to a trigger event, or a combination thereof.

In some examples of the method 800, transmitting the at least one report, at block 835, may include collecting information associated with the handling of the data at a serving gateway, and forwarding the collected information to the application server via a SCEF server.

In some examples of the method 800, transmitting the at least one report, at block 835, may include collecting information associated with the handling of the data from a serving gateway, at a MME, SMF, or AMF, and forwarding the collected information from the MME to the application server via a SCEF server. In these examples, the MME may add information to the collected information before forwarding the collected information from the MME to the application server via the SCEF server.

In some examples, aspects of the method 700 and 800 described with reference to FIGS. 7 and 8 may be combined.

Figure 9:
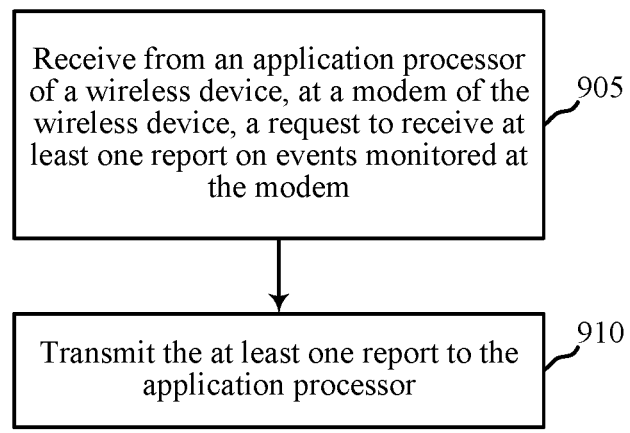
FIG. 9 is a flow chart illustrating an example of a method for wireless communication, in accordance with one or more aspects of the present disclosure.

FIG. 9 is a flow chart illustrating an example of a method 900 for wireless communication, in accordance with one or more aspects of the present disclosure. For clarity, the method 900 is described below with reference to aspects of a wireless device or UE 115 described with reference to FIG. 1, 4, 5, or 6. In some examples, a wireless device may execute one or more sets of codes to control the functional elements of the wireless device to perform the functions described below. Additionally or alternatively, the wireless device may perform one or more of the functions described below using special-purpose hardware.

At block 905, the method 900 may include receiving from an application processor of a wireless device, at a modem of the wireless device, a request to receive at least one report on events monitored at the modem. The operation(s) at block 905 may be performed by the modem 620-a described with reference to FIG. 6.

At block 910, the method 900 may include transmitting the at least one report (e.g., at least one status report) to the application processor. The operation(s) at block 910 may be performed by the modem 620-a described with reference to FIG. 6.

In some examples of the method 900, the at least one report may include a modem status or a data packet status. The modem status may include, for example, a first indication of an expected wait time until the modem becomes active; a second indication of a modem state transition from not active to active; a third indication of a modem state transition from active to not active; or a combination thereof. The data packet status may include, for example, a first indication of data packets received and stored in a modem memory; a second indication of data packets queued at the modem; a third indication of data packets dropped by the modem; a fourth indication of data packets transmitted by the modem; a fifth indication of data packets successfully received by a device to which the modem transmits over the radio frequency spectrum; or a combination thereof.

In some examples of the method 900, the at least one report may be transmitted to the application processor on demand, periodically, in response to a trigger event, or a combination thereof.

Figure 10:
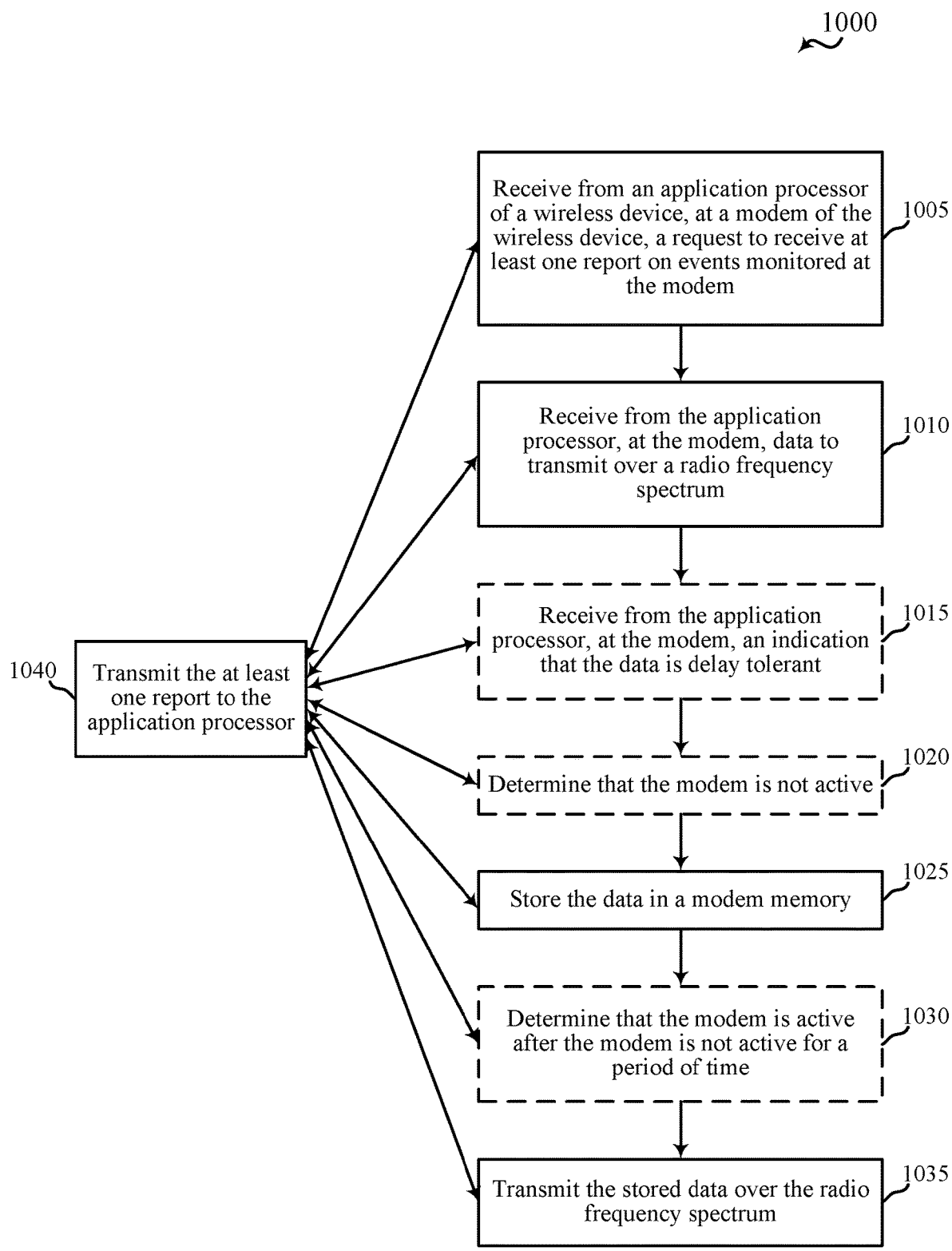
FIG. 10 is a flow chart illustrating an example of a method for wireless communication, in accordance with one or more aspects of the present disclosure.

FIG. 10 is a flow chart illustrating an example of a method 1000 for wireless communication, in accordance with one or more aspects of the present disclosure. For clarity, the method 1000 is described below with reference to aspects of a wireless device or UE 115 described with reference to FIG. 1, 4, 5, or 6. In some examples, a wireless device may execute one or more sets of codes to control the functional elements of the wireless device to perform the functions described below. Additionally or alternatively, the wireless device may perform one or more of the functions described below using special-purpose hardware.

At block 1005, the method 1000 may include receiving from an application processor of a wireless device, at a modem of the wireless device, a request to receive at least one report on events monitored at the modem. The operation(s) at block 1005 may be performed by the modem 620-a described with reference to FIG. 6.

At block 1010, the method 1000 may include receiving from the application processor, at the modem, data to transmit over a radio frequency spectrum. The operation(s) at block 1010 may be performed by the modem 620-a described with reference to FIG. 6.

At block 1015, the method 1000 may optionally include receiving from the application processor, at the modem, an indication that the data is delay tolerant. The operation(s) at block 1015 may be performed by the modem 620-a described with reference to FIG. 6.

In some examples, the operations at two or more of blocks 1005, 1010, or 1015 may be combined in a same transmission.

At block 1020, the method 1000 may optionally include determining that the modem is not active. The operation(s) at block 1020 may be performed by the modem 620-a described with reference to FIG. 6.

At block 1025, the method 1000 may include storing the data received at block 1010 in a modem memory. In some examples, the data may be stored in the modem memory based at least in part on receiving an indication that the data is delay tolerant (at block 1015) and/or determining that the modem is not active (at block 1020). The operation(s) at block 1025 may be performed by the modem 620-a or modem memory 630 described with reference to FIG. 6.

At block 1030, the method 1000 may optionally include determining that the modem is active after the modem is not active for a period of time. The operation(s) at block 1030 may be performed by the modem 620-a described with reference to FIG. 6.

At block 1035, the method 1000 may include transmitting the stored data over the radio frequency spectrum. In some examples, the stored data may be transmitted based at least in part on determining the modem is active (at block 1030). The operation(s) at block 1035 may be performed by the modem 620-a described with reference to FIG. 6.

At block 1040, and before, during, or after one or more of blocks 1005, 1010, 1015, 1020, 1025, 1030, or 1035, the method 1000 may include transmitting at least one report (e.g., at least one status report) to the application processor. The operation(s) at block 1040 may be performed by the modem 620-a described with reference to FIG. 6.

In some examples of the method 1000, the at least one report may include a modem status or a data packet status. The modem status may include, for example, a first indication of an expected wait time until the modem becomes active or ready to transmit; a second indication of a modem state transition from not active or not ready to transmit, to active; a third indication of a modem state transition from active to not active; or a combination thereof. The data packet status may include, for example, a first indication of data packets received and stored in a modem memory; a second indication of data packets queued at the modem; a third indication of data packets dropped by the modem; a fourth indication of data packets transmitted by the modem; a fifth indication of data packets successfully received by a device to which the modem transmits over the radio frequency spectrum; or a combination thereof.

In some examples of the method 1000, the at least one report may be transmitted to the application processor on demand, periodically, in response to a trigger event, or a combination thereof.

In some examples, aspects of the method 900 and 1000 described with reference to FIGS. 9 and 10 may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method of wireless communications at a network node of a core network of a wireless communications system, comprising:

receiving, from an application server that is external to the core network, an indication of data to be delivered to at least one wireless device;

receiving, from the application server that is external to the core network, a data handling monitoring request that is associated with the data and requests at least one report indicating a handling, by the network node of the core network, of the data to be delivered to the at least one wireless device;

determining the handling of the data at the network node of the core network; and transmitting, to the application server that is external to the core network, the at least one report indicating the handling of the data to be delivered to the at least one wireless device, wherein the at least one report comprises a first indication of one or more data packets of the data stored at the network node, a second indication of one or more data packets of the data forwarded to the at least one wireless device, a third indication of one or more data packets of the data dropped at the core network, or any combination thereof.

2. The method of claim 1, wherein the at least one report indicating the handling of the data is based at least in part on the data handling monitoring request.

3. The method of claim 1, further comprising:
receiving, from the application server, a data handling request applicable to the data.

4. The method of claim 3, wherein the data handling request comprises:
a fourth indication of whether to store the data, prior to delivery of the data to a wireless device of the at least one wireless device, when the wireless device is unreachable; a fifth indication of a maximum time to store the data when the wireless device is unreachable; a sixth indication of a maximum number of data packets to store when the wireless device is unreachable; or a combination thereof.

5. The method of claim 1, wherein the at least one report indicating the handling of the data comprises:
a fourth indication of one or more data packets of the data received; a fifth indication of an expected data packet storage time; a sixth indication of a maximum data packet storage time; a seventh indication of a number of one or more data packets of the data queued for delivery to the at least one wireless device; an eighth indication of one or more data packets of the data dropped in a radio access network coupling the core network to the at least one wireless device; a ninth indication of one or more data packets of the data successfully received by the at least one wireless device; or a combination thereof.

6. The method of claim 1, wherein the determined handling of the data comprises a storage of the data prior to delivery of the data to a wireless device of the at least one wireless device.

7. The method of claim 6, wherein the determined handling of the data comprises a forwarding of the stored data to the wireless device.

8. The method of claim 1, wherein the at least one report indicating the handling of the data is transmitted to the application server: on demand;
periodically; in response to a trigger event; or a combination thereof.

9. The method of claim 1, wherein transmitting the at least one report indicating the handling of the data to the application server comprises:

collecting information associated with the handling of the data at a gateway; and
forwarding the collected information to the application server via a server.

10. The method of claim 1, wherein transmitting the at least one report indicating the handling of the data to the application server comprises:
collecting information associated with the handling of the data from a gateway, at a mobility management function; and
forwarding the collected information from the mobility management function to the application server via a server.

11. The method of claim 10, further comprising:
adding information to the collected information at the mobility management function, before forwarding the collected information from the mobility management function to the application server via the server.

12. The method of claim 1, wherein the at least one report indicating the handling of the data at the network node of the core network, which is transmitted by the network node of the core network to the application server from which the indication of the data to be delivered to the at least one wireless device was received, comprises an indication of one or more data packets of the data received at the network node of the core network from the application server.

13. The method of claim 1, wherein the at least one report indicating the handling of the data at the network node of the core network, which is transmitted by the network node of the core network to the application server from which the indication of the data to be delivered to the at least one wireless device was received, comprises the first indication of one or more data packets of the data stored at the network node of the core network.

14. The method of claim 1, wherein the at least one report indicating the handling of the data at the network node of the core network, which is transmitted by the network node of the core network to the application server from which the indication of the data to be delivered to the at least one wireless device was received, comprises an indication of an expected data packet storage time of one or more data packets of the data received at the network node of the core network from the application server and stored at the network node of the core network.

15. The method of claim 1, wherein the at least one report indicating the handling of the data at the network node of the core network, which is transmitted by the network node of the core network to the application server from which the indication of the data to be delivered to the at least one wireless device was received, comprises an indication of a maximum data packet storage time of one or more data packets of the data received at the network node of the core network from the application server and stored at the network node of the core network.

16. The method of claim 1, wherein the at least one report indicating the handling of the data at the network node of the core network, which is transmitted by the network node of the core network to the application server from which the indication of the data to be delivered to the at least one wireless device was received, comprises an indication of a number of data packets received at the network node of the core network from the application server and queued for delivery to the at least one wireless device.

17. The method of claim 1, wherein the at least one report indicating the handling of the data at the network node of the core network, which is transmitted by the network node of the core network to the application server from which the indication of the data to be delivered to the at least one wireless device was received, comprises the second indication of one or more data packets of the data forwarded to the at least one wireless device.

18. The method of claim 1, wherein the at least one report indicating the handling of the data at the network node of the core network, which is transmitted by the network node of the core network to the application server from which the indication of the data to be delivered to the at least one wireless device was received, comprises the third indication of one or more data packets of the data dropped at the network node of the core network.

19. The method of claim 1, wherein the at least one report indicating the handling of the data at the network node of the core network, which is transmitted by the network node of the core network to the application server from which the indication of the data to be delivered to the at least one wireless device was received, comprises an indication of one or more data packets of the data received at the network node of the core network from the application server and dropped in a radio access network coupling the core network to the at least one wireless device.

20. The method of claim 1, wherein the at least one report indicating the handling of the data at the network node of the core network, which is transmitted by the network node of the core network to the application server from which the indication of the data to be delivered to the at least one wireless device was received, comprises an indication of one or more data packets of the data received at the network node of the core network from the application server and successfully received by the at least one wireless device.

21. An apparatus for wireless communications at a network node of a core network of a wireless communications system, comprising:
one or more memories; and
one or more processors coupled with the one or more memories, the one or more processors configured to:
receive, from an application server that is external to the core network, an indication of data to be delivered to at least one wireless device;
receive, from the application server that is external to the core network, a data handling monitoring request that is associated with the data and requests at least one report indicating a handling, by the network node of the core network, of the data to be delivered to the at least one wireless device;
determine the handling of the data at the network node of the core network; and
transmit, to the application server that is external to the core network, the at least one report indicating the handling of the data to be delivered to the at least one wireless device, wherein the at least one report comprises a first indication of one or more data packets of the data stored at the network node, a second indication of one or more data packets of the data forwarded to the at least one wireless device, a third indication of one or more data packets of the data dropped at the core network, or any combination thereof.

22. The apparatus of claim 21, wherein the at least one report indicating the handling of the data at the network node of the core network comprises the first indication of the one or more data packets of the data stored at the network node.

23. The apparatus of claim 21, wherein the at least one report indicating the handling of the data at the network node of the core network comprises the second indication of the one or more data packets of the data forwarded to the at least one wireless device.

24. The apparatus of claim 21, wherein the at least one report indicating the handling of the data at the network node of the core network comprises the third indication of the one or more data packets of the data dropped at the core network.

25. The apparatus of claim 21, wherein:
the at least one report indicating the handling of the data is based at least in part on the data handling monitoring request.

26. The apparatus of claim 21, wherein the at least one report indicating the handling of the data comprises:
a fourth indication of one or more data packets of the data received; a fifth indication of an expected data packet storage time; a sixth indication of a maximum data packet storage time; a seventh indication of a number of data packets queued for delivery to the at least one wireless device; an eighth indication of one or more data packets of the data dropped in a radio access network coupling the core network to the at least one wireless device; a ninth indication of one or more data packets of the data successfully received by the at least one wireless device; or a combination thereof.

27. The apparatus of claim 21, wherein the determined handling of the data comprises a storage of the data prior to delivery of the data to a wireless device of the at least one wireless device.

28. The apparatus of claim 27, wherein the determined handling of the data comprises a forwarding of the stored data to the wireless device.

29. The apparatus of claim 21, wherein the at least one report indicating the handling of the data is transmitted to the application server: on demand;
periodically; in response to a trigger event; or a combination thereof.

30. The apparatus of claim 21, wherein to transmit, to the application server, the at least one report indicating the handling of the data the one or more processors are configured to:
collect information associated with the handling of the data at a gateway; and
forward the collected information to the application server via a server.

31. The apparatus of claim 21, wherein to transmit, to the application server, the at least one report indicating the handling of the data the one or more processors are configured to:
collect information associated with the handling of the data from a gateway, at a mobility management function; and
forward the collected information from the mobility management function to the application server via a server.

32. The apparatus of claim 31, wherein the one or more processors are further configured to:
add information to the collected information at the mobility management function, before forwarding the collected information from the mobility management function to the application server via the server.

33. A method of wireless communications at an application server that is external to a core network of a wireless communications system, comprising:
transmitting, to a network node of the core network, an indication of data to be delivered to at least one wireless device;
transmitting, to the network node of the core network, a data handling monitoring request that is associated with the data and requests at least one report indicating a handling, by the network node of the core network, of the data to be delivered to the at least one wireless device; and receiving the at least one report indicating the handling of the data to be delivered to the at least one wireless device, wherein the at least one report comprises a first indication of one or more data packets of the data stored at the network node, a second indication of one or more data packets of the data forwarded to the at least one wireless device, a third indication of one or more data packets of the data dropped at the core network, or any combination thereof.

34. The method of claim 33, wherein the at least one report indicating the handling of the data is based at least in part on the data handling monitoring request.

35. The method of claim 33, further comprising:
transmitting, from the application server, a data handling request applicable to the data.

36. The method of claim 35, wherein the data handling request comprises:
a fourth indication of whether to store the data, prior to delivery of the data to a wireless device of the at least one wireless device, when the wireless device is unreachable; a fifth indication of a maximum time to store the data when the wireless device is unreachable; a sixth indication of a maximum number of data packets to store when the wireless device is unreachable; or a combination thereof.

37. The method of claim 33, wherein the at least one report indicating the handling of the data comprises:
a fourth indication of one or more data packets of the data received; a fifth indication of an expected data packet storage time; a sixth indication of a maximum data packet storage time; a seventh indication of a number of one or more data packets of the data queued for delivery to the at least one wireless device; an eighth indication of one or more data packets of the data dropped in a radio access network coupling the core network to the at least one wireless device; a ninth indication of one or more data packets of the data successfully received by the at least one wireless device; or a combination thereof.

38. The method of claim 33, wherein the handling of the data comprises a storage of the data prior to delivery of the data to a wireless device of the at least one wireless device.

39. The method of claim 33, wherein receiving the at least one report indicating the handling of the data at the application server comprises:
collecting information associated with the handling of the data at a gateway; and
receiving, at the application server, the collected information forwarded via a server.

40. The method of claim 33, wherein the at least one report indicating the handling of the data is received by the application server: on demand;
periodically; in response to a trigger event; or a combination thereof.

41. The method of claim 33, wherein the at least one report indicating the handling of the data at the network node of the core network comprises the first indication of the one or more data packets of the data stored at the network node.

42. The method of claim 33, wherein the at least one report indicating the handling of the data at the network node of the core network comprises the second indication of the one or more data packets of the data forwarded to the at least one wireless device.

43. The method of claim 33, wherein the at least one report indicating the handling of the data at the network node of the core network comprises the third indication of the one or more data packets of the data dropped at the core network.

44. A non-transitory computer-readable medium storing code for wireless communications at a network node of a core network of a wireless communications system, the code comprising instructions executable by one or more processors to:
receive, from an application server that is external to the core network of the wireless communications system, an indication of data to be delivered to at least one wireless device;
receive, from the application server that is external to the core network, a data handling monitoring request that is associated with the data and requests at least one report indicating a handling, by the network node of the core network, of the data to be delivered to the at least one wireless device;
determine the handling of the data at the network node of the core network; and
transmit, to the application server that is external to the core network, the at least one report indicating the handling of the data to be delivered to the at least one wireless device, wherein the at least one report comprises a first indication of one or more data packets of the data stored at the network node, a second indication of one or more data packets of the data forwarded to the at least one wireless device, a third indication of one or more data packets of the data dropped at the core network, or any combination thereof.

45. The non-transitory computer-readable medium of claim 44, wherein:
the at least one report indicating the handling of the data is based at least in part on the data handling monitoring request.

46. The non-transitory computer-readable medium of claim 45, wherein the at least one report indicating the handling of the data comprises:
a fourth indication of one or more data packets of the data received; a fifth indication of an expected data packet storage time; a sixth indication of a maximum data packet storage time; a seventh indication of a number of data packets queued for delivery to the at least one wireless device; an eighth indication of one or more data packets of the data dropped in a radio access network coupling the core network to the at least one wireless device; a ninth indication of one or more data packets of the data successfully received by the at least one wireless device; or a combination thereof.

47. The non-transitory computer-readable medium of claim 44, wherein the determined handling of the data comprises a storage of the data prior to delivery of the data to a wireless device of the at least one wireless device.

48. The non-transitory computer-readable medium of claim 47, wherein the determined handling of the data comprises a forwarding of the stored data to the wireless device.

49. The non-transitory computer-readable medium of claim 44, wherein the at least one report indicating the handling of the data is transmitted to the application server: on demand; periodically; in response to a trigger event; or a combination thereof.

50. The non-transitory computer-readable medium of claim 44, wherein the instructions to transmit the at least one report indicating the handling of the data to the application server are executable by the one or more processors to:

collect information associated with the handling of the data at a gateway; and forward the collected information to the application server via a server.

51. The non-transitory computer-readable medium of claim 44, wherein the instructions to transmit the at least one report indicating the handling of the data to the application server are executable by the one or more processors to:

collect information associated with the handling of the data from a gateway, at a mobility management function; and forward the collected information from the mobility management function to the application server via a server.

52. The non-transitory computer-readable medium of claim 51, wherein the instructions are further executable by the one or more processors to:

add information to the collected information at the mobility management function, before forwarding the collected information from the mobility management function to the application server via the server.

53. The non-transitory computer-readable medium of claim 44, wherein the at least one report indicating the handling of the data at the network node of the core network comprises the first indication of the one or more data packets of the data stored at the network node.

54. The non-transitory computer-readable medium of claim 44, wherein the at least one report indicating the handling of the data at the network node of the core network comprises the second indication of the one or more data packets of the data forwarded to the at least one wireless device.

55. The non-transitory computer-readable medium of claim 44, wherein the at least one report indicating the handling of the data at the network node of the core network comprises the third indication of the one or more data packets of the data dropped at the core network.

56. An apparatus for wireless communication at an application server that is external to a core network, comprising:

one or more memories; and one or more processors coupled with the one or more memories, the one or more processors configured to:

transmit, to a network node of the core network, an indication of data to be delivered to at least one wireless device;

transmit, to the network node of the core network, a data handling monitoring request that is associated with the data and requests at least one report indicating a handling, by the network node of the core network, of the data to be delivered to the at least one wireless device; and receive, the at least one report indicating the handling of the data to be delivered to the at least one wireless device, wherein the at least one report comprises a first indication of one or more data packets of the data stored at the network node, a second indication of one or more data packets of the data forwarded to the at least one wireless device, a third indication of one or more data packets of the data dropped at the core network, or any combination thereof.

57. The apparatus of claim 56, wherein:

the at least one report indicating the handling of the data is based at least in part on the data handling monitoring request.

58. The apparatus of claim 56, wherein the at least one report indicating the handling of the data comprises:

a fourth indication of one or more data packets of the data received; a fifth indication of an expected data packet storage time; a sixth indication of a maximum data packet storage time; a seventh indication of a number of one or more data packets of the data queued for delivery to the at least one wireless device; an eighth indication of one or more data packets of the data dropped in a radio access network coupling the core network to the at least one wireless device; a ninth indication of one or more data packets of the data successfully received by the at least one wireless device; or a combination thereof.

59. The apparatus of claim 56, wherein the handling of the data comprises a storage of the data prior to delivery of the data to a wireless device of the at least one wireless device.

60. The apparatus of claim 56, wherein to receive the at least one report indicating the handling of the data at the application server the one or more processors are configured to:

collect information associated with the handling of the data at a gateway; and receive, at the application server, the collected information forwarded via a server.

61. The apparatus of claim 56, wherein the at least one report indicating the handling of the data is received by the application server on demand;

periodically; in response to a trigger event; or a combination thereof.

62. The apparatus of claim 56, wherein the at least one report indicating the handling of the data at the network node of the core network comprises the first indication of the one or more data packets of the data stored at the network node.

63. The apparatus of claim 56, wherein the at least one report indicating the handling of the data at the network node of the core network comprises the second indication of the one or more data packets of the data forwarded to the at least one wireless device.

64. The apparatus of claim 56, wherein the at least one report indicating the handling of the data at the network node of the core network comprises the third indication of the one or more data packets of the data dropped at the core network.

65. A non-transitory computer-readable medium storing code for wireless communications at an application server that is external to a core network of a wireless communications system, the code comprising instructions executable by one or more processors to:

transmit, to a network node of the core network, an indication of data to be delivered to at least one wireless device;

transmit, to the network node of the core network, a data handling monitoring request that is associated with the data and requests at least one report indicating a handling, by the network node of the core network, of the data to be delivered to the at least one wireless device; and receive, the at least one report indicating the handling of the data to be delivered to the at least one wireless device, wherein the at least one report comprises a first indication of one or more data packets of the data stored at the network node, a second indication of one or more data packets of the data forwarded to the at least one wireless device, a third indication of one or more data packets of the data dropped at the core network, or any combination thereof.

66. The non-transitory computer-readable medium of claim 65, wherein:

the at least one report indicating the handling of the data is based at least in part on the data handling monitoring request.

67. The non-transitory computer-readable medium of claim 65, wherein the at least one report indicating the handling of the data comprises:
a fourth indication of one or more data packets of the data received; a fifth indication of an expected data packet storage time; a sixth indication of a maximum data packet storage time; a seventh indication of a number of one or more data packets of the data queued for delivery to the at least one wireless device; an eighth indication of one or more data packets of the data dropped in a radio access network coupling the core network to the at least one wireless device; a ninth indication of one or more data packets of the data successfully received by the at least one wireless device; or a combination thereof.

68. The non-transitory computer-readable medium of claim 65, wherein the handling of the data comprises a storage of the data prior to delivery of the data to a wireless device of the at least one wireless device.

69. The non-transitory computer-readable medium of claim 65, wherein the instructions to receive the at least one report indicating the handling of the data at the application server are executable by the one or more processors to:
collect information associated with the handling of the data at a gateway; and
receive, at the application server, the collected information forwarded via a server.

70. The non-transitory computer-readable medium of claim 65, wherein the at least one report indicating the handling of the data is received by the application server on demand; periodically; in response to a trigger event; or a combination thereof.

71. The non-transitory computer-readable medium of claim 65, wherein the at least one report indicating the handling of the data at the network node of the core network comprises the first indication of the one or more data packets of the data stored at the network node.

72. The non-transitory computer-readable medium of claim 65, wherein the at least one report indicating the handling of the data at the network node of the core network comprises the second indication of the one or more data packets of the data forwarded to the at least one wireless device.

73. The non-transitory computer-readable medium of claim 65, wherein the at least one report indicating the handling of the data at the network node of the core network comprises the third indication of the one or more data packets of the data dropped at the core network.

\* \* \* \* \*